(12) United States Patent
Cundall

(10) Patent No.: US 12,093,219 B2
(45) Date of Patent: Sep. 17, 2024

(54) ENHANCE CONTROL OF COMMUNICATION SESSIONS

(71) Applicant: MICROSOFT TECHNOLOGY LICENSING, LLC, Redmond, WA (US)

(72) Inventor: Samuel Robert Cundall, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/565,223

(22) Filed: Dec. 29, 2021

(65) Prior Publication Data
US 2023/0205737 A1  Jun. 29, 2023

(51) Int. Cl.
| | |
|---|---|
| *G06F 3/04842* | (2022.01) |
| *G06F 3/0486* | (2013.01) |
| *G06F 16/16* | (2019.01) |
| *G06F 16/176* | (2019.01) |
| *G06F 21/62* | (2013.01) |

(52) U.S. Cl.
CPC ........ *G06F 16/168* (2019.01); *G06F 3/04842* (2013.01); *G06F 3/0486* (2013.01); *G06F 16/176* (2019.01); *G06F 21/6209* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 6,119,147 A | * | 9/2000 | Toomey | H04L 12/1831 719/329 |
| 7,904,323 B2 | | 3/2011 | Anders et al. | |
| 8,397,168 B2 | | 3/2013 | Leacock et al. | |
| 10,133,720 B2 | | 11/2018 | Rothschiller et al. | |
| 10,382,381 B2 | | 8/2019 | Labey | |

(Continued)

OTHER PUBLICATIONS

"Glowbl Workplace", Retrieved From: https://www.glowbl.com/en/digital-twin/, Retrieved on: Sep. 21, 2021, 14 Pages.

(Continued)

*Primary Examiner* — Tuyetlien T Tran
(74) *Attorney, Agent, or Firm* — Scott Y. Shigeta; Newport IP, LLC

(57) ABSTRACT

The techniques disclosed herein enable users to receive visits from other users in a desktop environment and initiate communication sessions using a drag and drop gesture input to move virtual representations or avatars of other users. For instance, by dragging and dropping an avatar into a file, the user can select the file for sharing and the system can automatically grant appropriate permissions to various users who are invited by the gesture input. The user can additionally grant other users' permission to edit the shared file which is reflected in an update to each user's permission data. In this way, users can communicate and collaborate directly form the social space of a desktop without opening a communication application. Other features include suggestions for files to share based on the context of a conversation, presenting contextual information alongside each user's avatar and suggesting other shared spaces to explore.

20 Claims, 27 Drawing Sheets

(56) References Cited

U.S. PATENT DOCUMENTS

| | | | |
|---|---|---|---|
| 11,023,092 B2 | 6/2021 | Van Wie et al. | |
| 2008/0222295 A1* | 9/2008 | Robinson | G06F 16/954 709/227 |
| 2008/0252637 A1* | 10/2008 | Berndt | G06T 19/00 345/419 |
| 2008/0307324 A1* | 12/2008 | Westen | H04N 7/15 715/753 |
| 2010/0041442 A1 | 2/2010 | Hong | |
| 2010/0070930 A1* | 3/2010 | Thibault | G06Q 10/10 715/854 |
| 2011/0239117 A1 | 9/2011 | Sutton et al. | |
| 2011/0296043 A1* | 12/2011 | Sutton | G06Q 10/10 709/227 |
| 2012/0297329 A1* | 11/2012 | Tanaka | G06F 3/0486 715/769 |
| 2014/0085316 A1 | 3/2014 | Narayanan | |
| 2015/0256883 A1* | 9/2015 | Chavez | H04N 21/8173 725/110 |
| 2020/0296147 A1* | 9/2020 | Eliason | H04L 65/403 |
| 2021/0352120 A1* | 11/2021 | Masi | H04L 67/025 |
| 2022/0078374 A1* | 3/2022 | Au | G06F 3/0486 |
| 2022/0214743 A1* | 7/2022 | Dascola | G06F 3/0482 |

OTHER PUBLICATIONS

"Glue Platform", Retrieved From: https://web.archive.org/web/*/https:/glue.work/glue-platform/, May 22, 2020, 19 Pages.

"Rumii—Doghead Simulations", Retrieved From: https://web.archive.org/web/20200409100813/https://www.dogheadsimulations.com/rumii, Apr. 9, 2020, 5 Pages.

Matney, Lucas, "Facebook Finally Made a Good Virtual Reality App", Retrieved From: https://money.yahoo.com/facebook-finally-made-good-virtual-110022619.html, Aug. 19, 2021, 5 Pages.

Mulder, et al., "A Modular System for Collaborative Desktop VR/AR with a Shared Workspace", in Proceedings of the IEEE Virtual Reality, Mar. 27, 2004, 8 Pages.

"International Search Report and Written Opinion Issued in PCT Application No. PCT/US22/046494", Mailed Date: Feb. 2, 2023, 11 Pages.

* cited by examiner

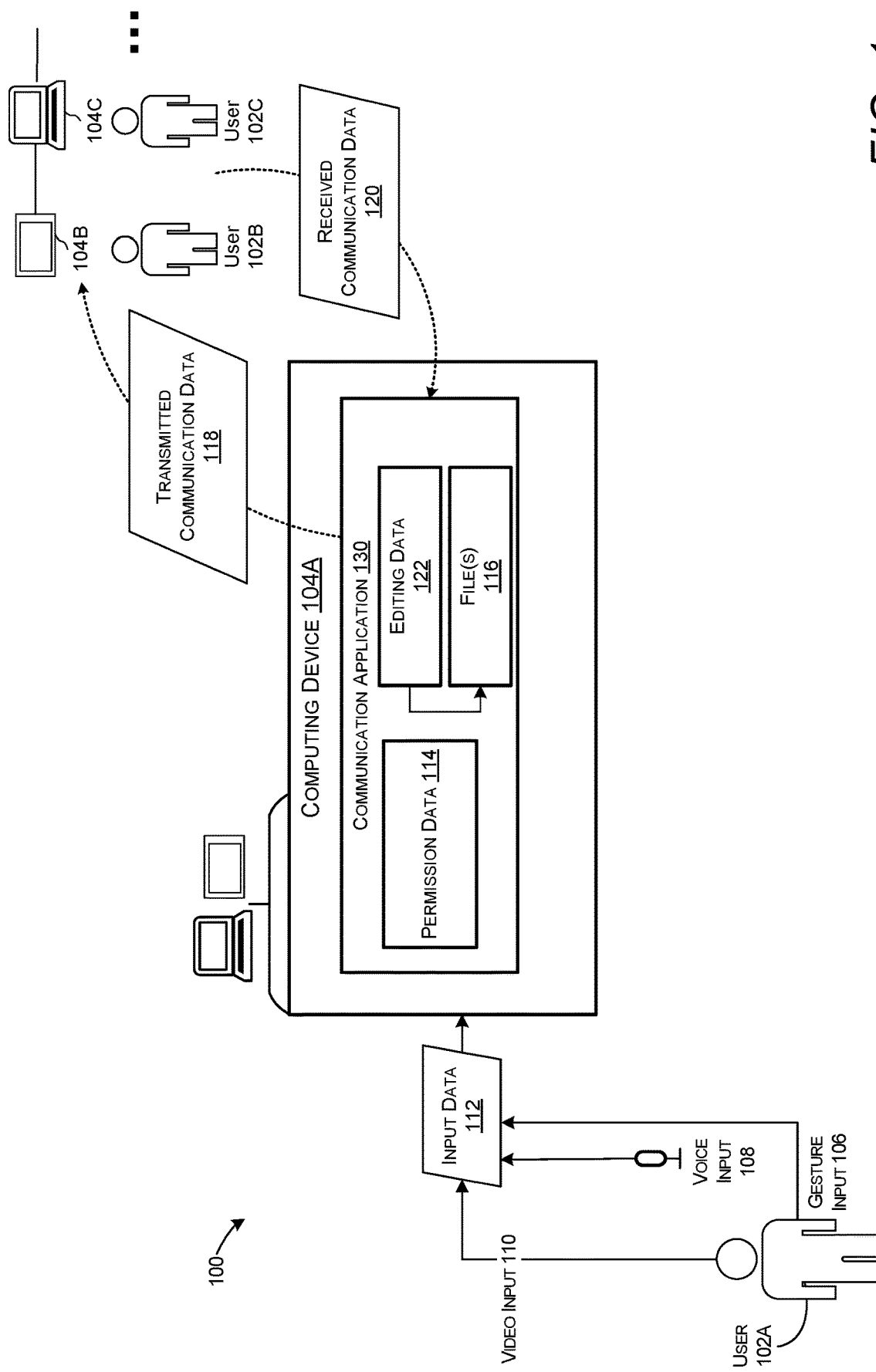

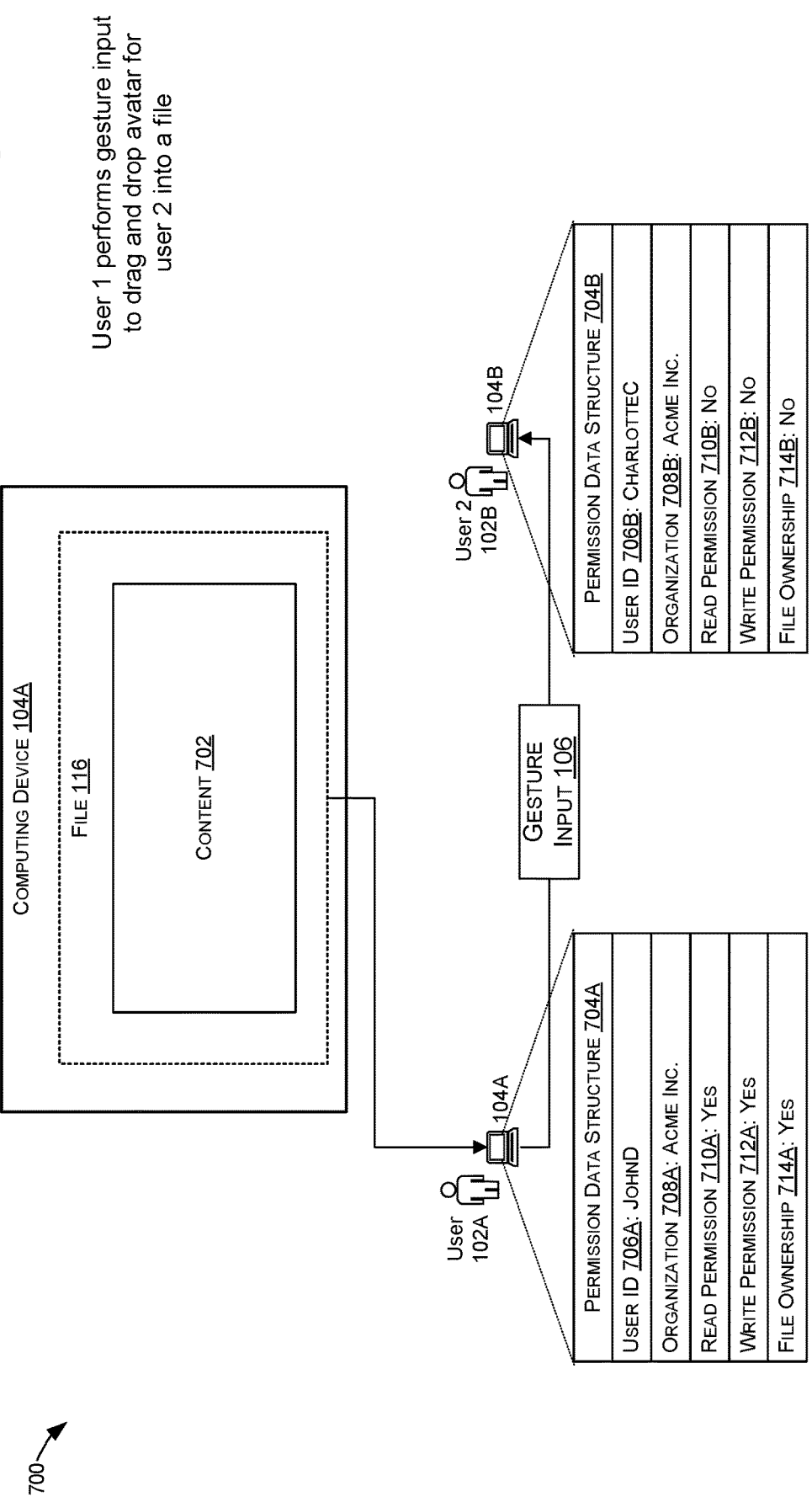

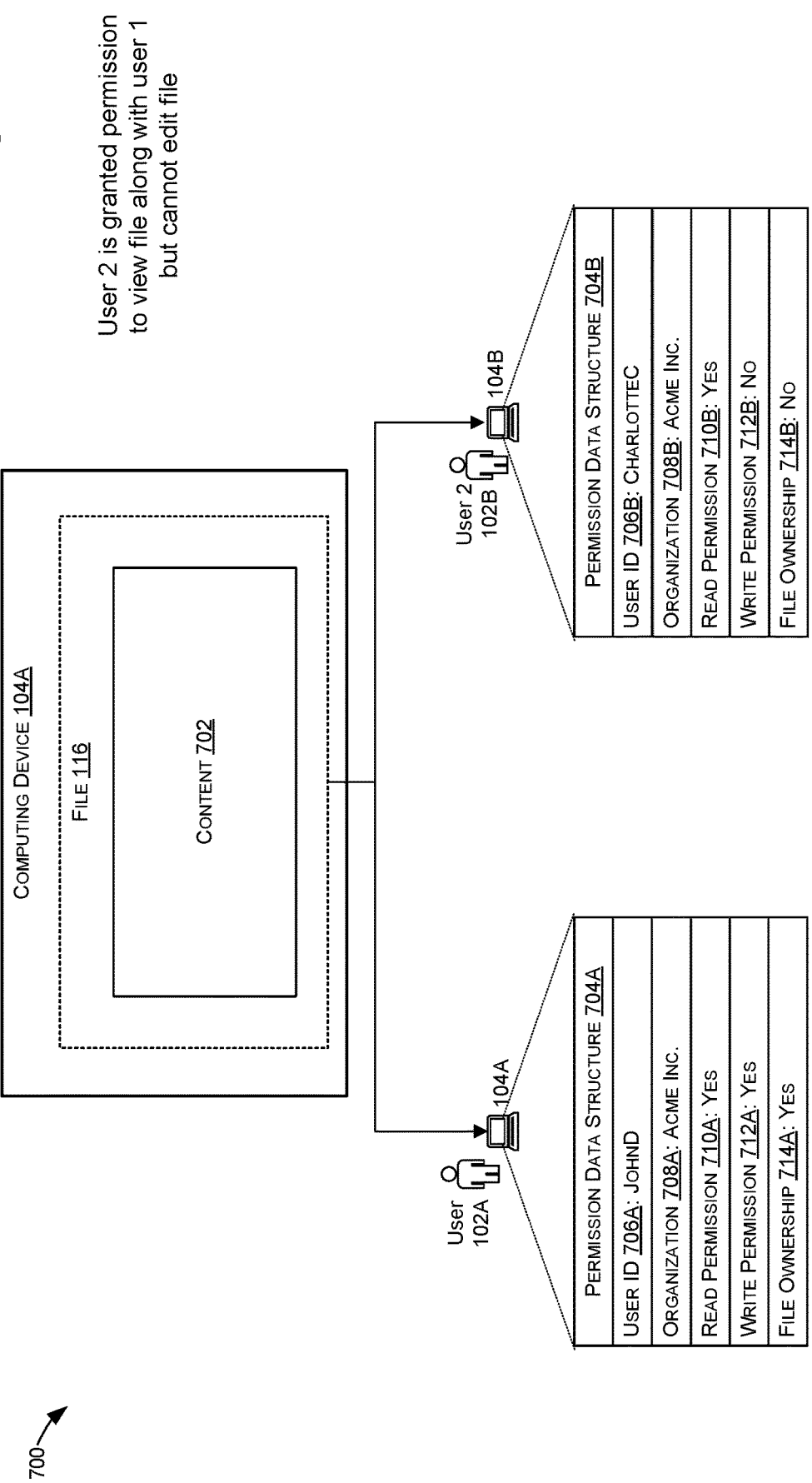

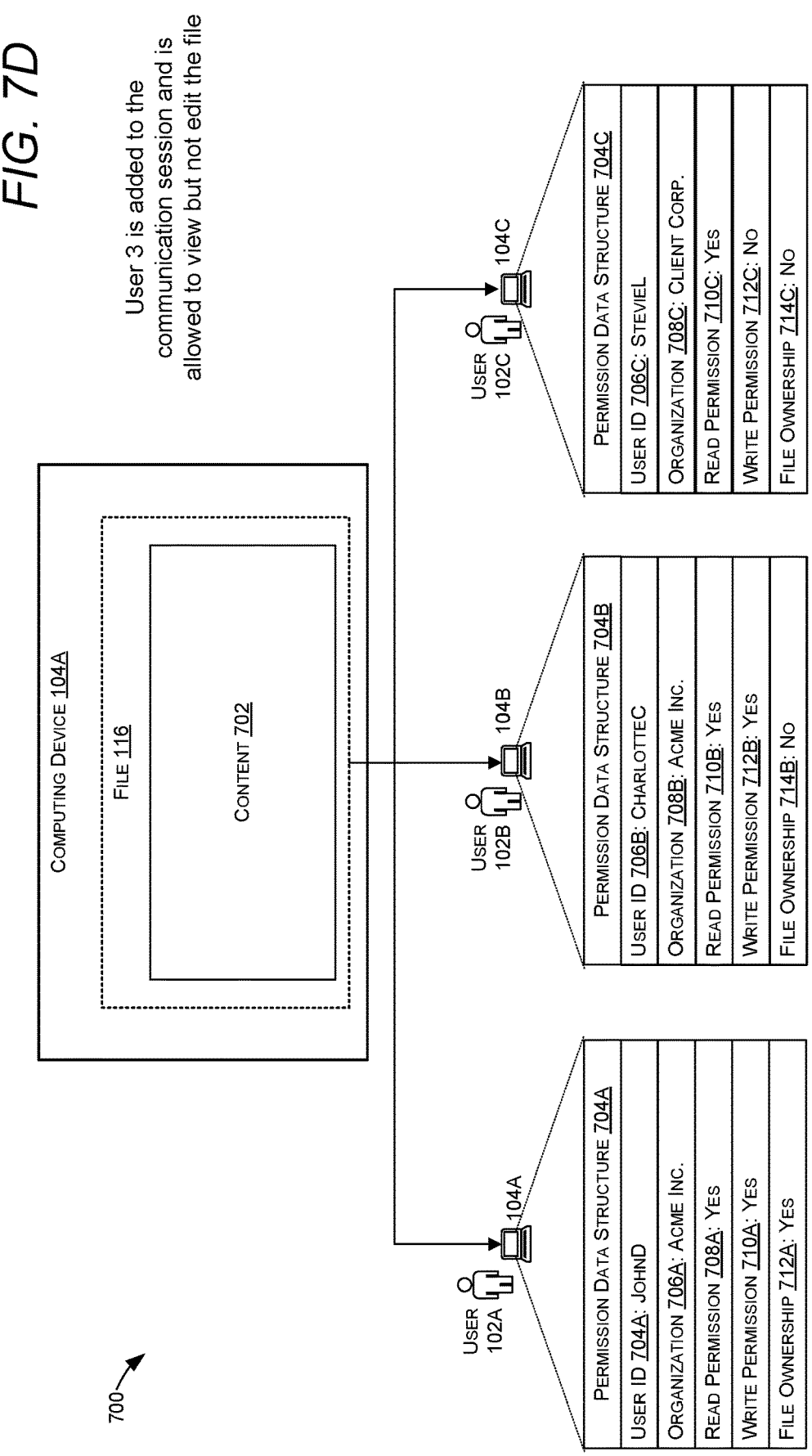

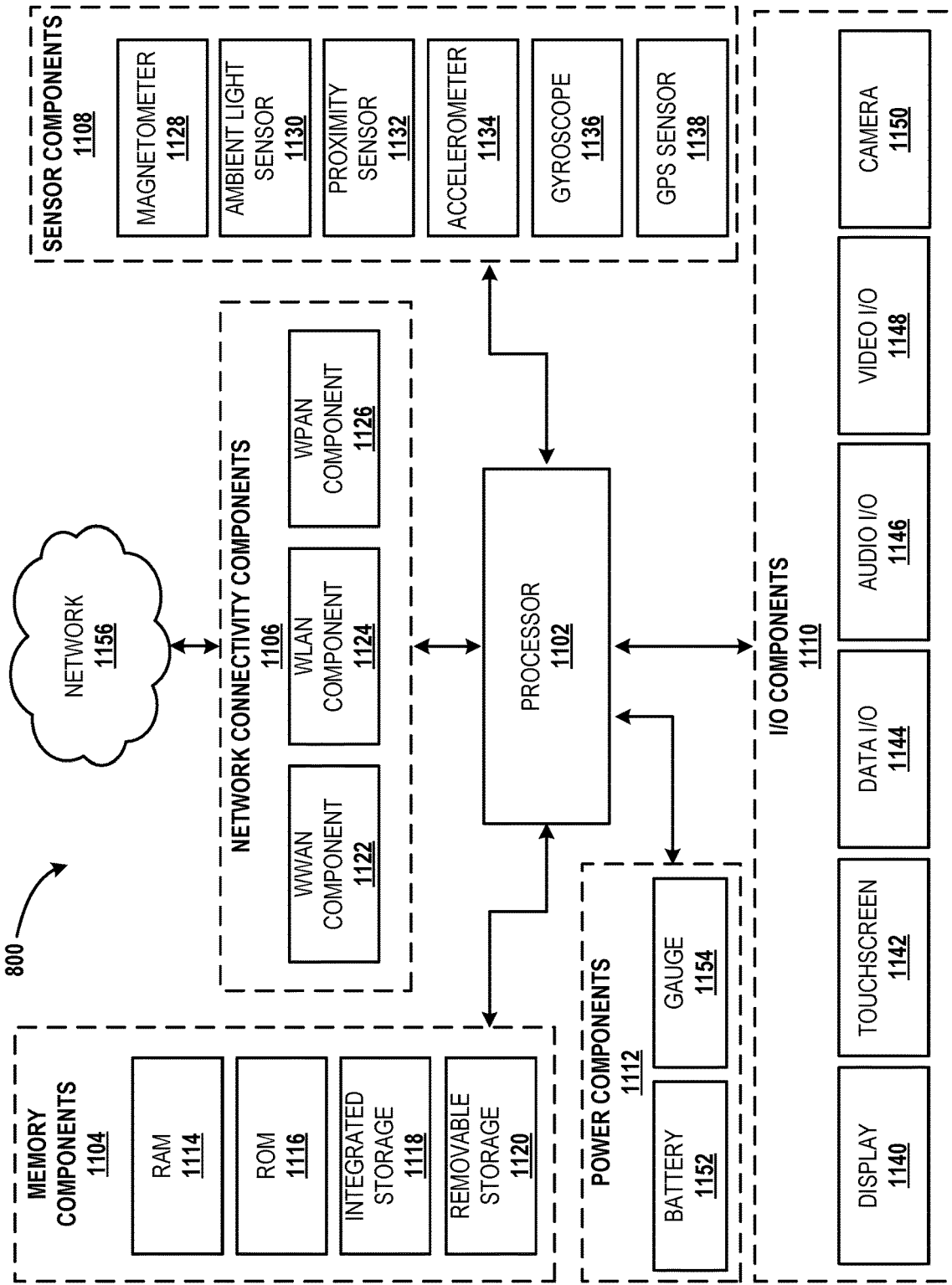

ENHANCE CONTROL OF COMMUNICATION SESSIONS

BACKGROUND

Communication and collaboration are key aspects in people's lives, both socially and in business. Communication and collaboration tools have been developed with the aim of connecting people to share experiences. In many cases, the aim of these tools is to provide, over a network, an experience which mirrors real life interaction between individuals and groups of people. Interaction is typically provided by audio and/or visual elements. In addition, user interactions enabled by the communication and collaboration tools can be enhanced by customizable avatars that graphically represent individual users.

Such tools include instant messaging, voice calls, video calls, group chat, shared desktop, shared media and content, shared applications, etc. Such tools can perform capture, manipulation, transmission and reproduction of audio and visual elements, and use various combinations of such elements in an attempt to provide a collaborative environment. A user can access such tools to create a teleconference session with multiple users by the use of a laptop or desktop computer, mobile phone, tablet, games console, etc. Such devices can be linked in a variety of possible network architectures, such as peer-to-peer architectures or client-server architectures or a hybrid, such as a centrally managed peer-to-peer architecture.

However, some current teleconference technologies can leave much to be desired. Some existing systems can lead to a cumbersome user experience and some features can hinder productivity. For example, in some existing systems, when a user desires to share and interact with certain types of content, such as a document or spreadsheet, the user often needs to open a separate window or a completely different program. In another example, a user wishing to initiate a communication session must manually open the appropriate program and find other users with whom to communicate. Furthermore, sharing a screen or transferring a file to other users in a communication session requires additional effort from the user in switching between applications or user interfaces. In any arrangement where a user is required to switch to a different window or a completely different program to conduct a task, a participant's attention is diverted from the contents of the teleconference session. While a user is engaged with other user interfaces or other programs, important subject matter communicated in the session may be missed or overlooked. Even worse, such distractions of one participant can reduce the overall engagement of all session participants.

It is with respect to these and other considerations that the disclosure made herein is presented.

SUMMARY

The techniques disclosed herein enable seamless control of a communication session and access to functionality for sharing file content from an operating system desktop environment. In some embodiments, a user can communicate with other users via virtual avatars that are displayed in a desktop environment. In this way, the user can utilize the various features of a communication application even while it is minimized or running in the background. The user can then direct a communication session to the contents of a file by the use of an input gesture applied avatars displayed on the desktop. The gesture can include a drag and drop gesture that moves an avatar to a rendering of a file. By enabling access to communication application functionality from the desktop even while the associated application is minimized, e.g., invisible, the disclosed system greatly streamlines and enhances the user experience. The disclosed techniques do not require a user to transition from a desktop environment to a communication application to share access to a file. In addition, such features, as will be described in more detail below, increase a user's productivity and the overall efficiency of human interaction with a computing device.

In some configurations, the system can track permission data for individual users that are involved in a communication session. For instance, as mentioned above, in response to a drag and drop gesture the system can initiate a communication session with the user who was selected by the gesture as well as screen sharing of the file selected by the gesture. As part of initiating the communication session, the system can modify permission data associated with the selected user. For example, prior to initiating the communication session, the user may not have permission to view and edit the selected file. Following the drag and drop gesture, the user may now have permission to view the file but can still be restricted from editing the file. Furthermore, the user who initiated the communication session can choose to grant permission to other users to edit the file selected by the initial drag and drop gesture from a desktop environment. In response, the system can enable co-authoring features such as by displaying graphical user interface elements that allow users to modify the file.

To further enhance the user experience, the system can display a rendering of an avatar for each participant of the communication session within the communication session. For instance, a communication session initiated by dragging and dropping a user avatar into a selected file can display the avatar within the screen share of the file. In this way, the system can enable a user to interact with the file while also maintaining engagement with other participants of the communication session. The system may also be configured to display communication data generated by participants of the communication session within the screen share environment. In a specific example, a screen sharing communication session can involve a spreadsheet document in which the avatar for each participant graphically moves about the document as the associated participant interacts with the document. In addition, participants may send messages in a text channel of the communication session. These text messages can then be displayed alongside the associated avatar to visually associate the message with a particular participant. In this way, the communication tool can operate seamlessly with various software applications to provide a unified user experience and streamline human interaction and improve usage of computing resources.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a diagram of a system for enabling invisible communication.

FIG. 7A is a block diagram of a data structure in a first step of a process for managing user permissions in a communication session.

FIG. 7B shows the block diagram of the data structure in a second step of a process for managing user permissions in a communication session.

FIG. 7D shows the block diagram of the data structure in a fourth step of a process for managing user permissions in a communication session.

FIG. 11 is a computer architecture diagram illustrating a computing device architecture for a computing device capable of implementing aspects of the techniques and technologies presented herein.

DETAILED DESCRIPTION

Figure 2A:
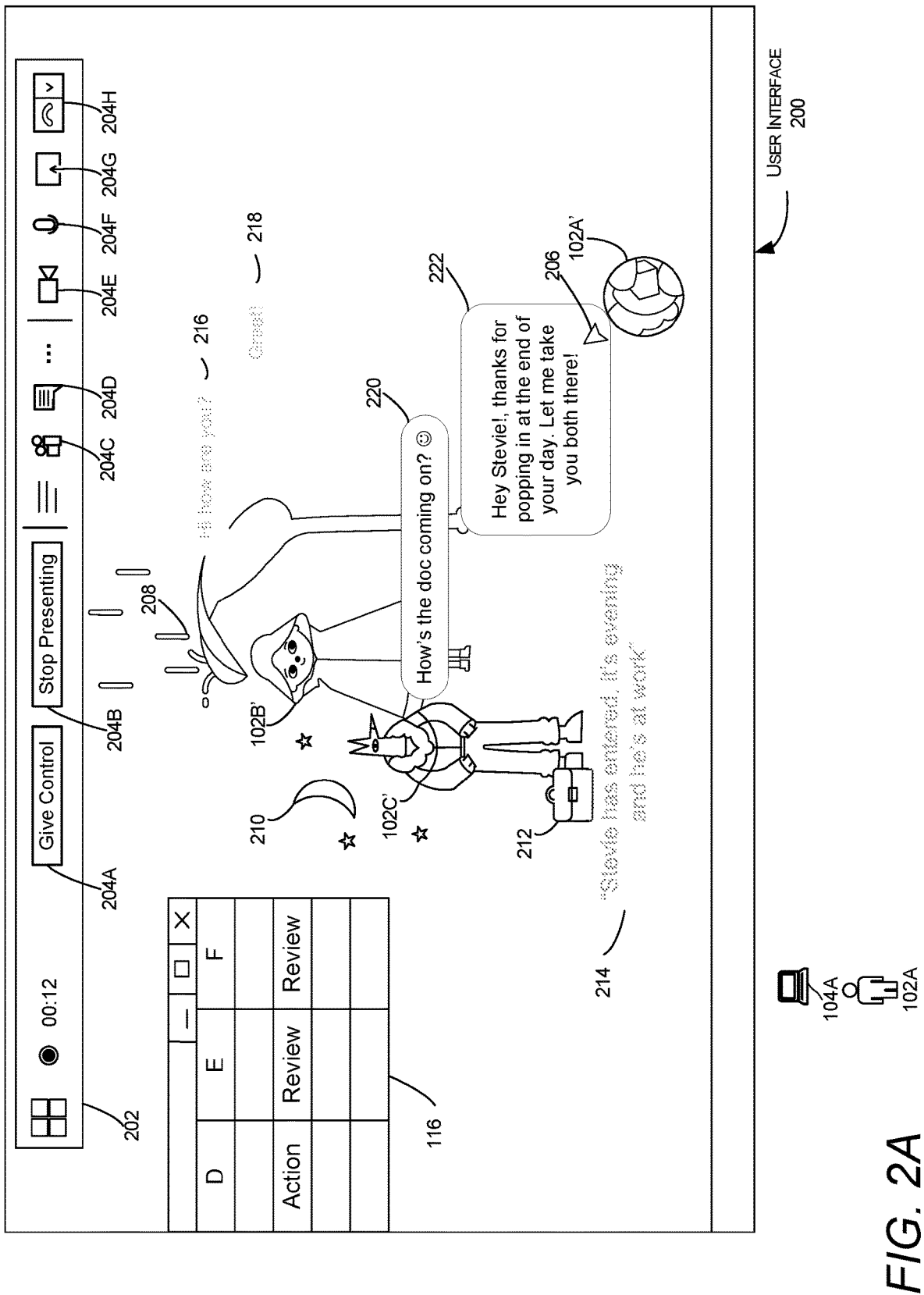
FIG. 2A shows an example user interface in a first step of a process for initiating a communication session using a gesture input.

The techniques described herein provide systems for optimizing the use of computing resources in communication and collaboration platforms and to enhance human-computer interaction. Despite advancements in the functionality of communication and collaboration tools, many existing systems can overwhelm users with information and complexity. In addition, existing systems can provide an overly sterile or inorganic user experience thus harming user engagement. For instance, in an existing system, if a user wishes to initiate a co-authoring session they must open a communication application, locate other users with whom to share the co-authoring session, begin a communication session with the other users, manually locate the desired file for co-authoring, then share the file to the other users. Naturally, such an approach to communication and collaboration reduces efficiency in computing resource use, unduly hampers productivity, and prevents meaningful interactions between the users. Communication and collaboration platforms can include computing resources, storage, operating systems and other components for executing applications, storing data, and the like.

Typically, existing systems aim to improve user experience and foster connections by implementing various features. For example, users can see each other through video chat, and express emotion though interactable icons (e.g., emoji). However, these features ultimately fall short of providing an organic user experience as users must still go through a communication application following the workflow mentioned above to initiate a communication session. As such, there is a need to improve the way in which a user interacts with functionality provided by a communication and collaboration platform.

The disclosed techniques address several technical problems associated with providing a streamlined user experience in communication and collaboration platforms. As mentioned above, existing solutions often overwhelm users with complexity and hinder productivity through unintuitive workflows. In contrast, the present disclosure enables a user to interact with other users and initiate a communication session even while the associated communication application is invisible (e.g., minimized). As mentioned above, a user can receive a visit from one or several other users via virtual avatars that are displayed in the user's desktop environment. In this way, the user's desktop becomes a social space in which to interact with others. The user can then perform a drag and drop gesture input to move an avatar about the desktop. If the user places the avatar in a file, the system can automatically initiate a communication session with a screen share of the file. Thus, the user can seamlessly begin collaborating with their peers thereby enhancing the user experience and increasing productivity.

In another example of the technical benefit of the present disclosure, the techniques described herein improve the performance of computing systems. This is possible due to the invisible communication enabled by the social space of the desktop and the drag and drop functionality for initiating a communication session. By reducing the effort required of the user to begin communicating and collaborating, the disclosed system can reduce the usage of computing resources as well as conserve networking resources. In addition, by streamlining the user experience, the system can prevent inadvertent inputs further conserving computing and networking resources.

Various examples, scenarios, and aspects that enable invisible communication are described below with reference to FIGS. 1-11. For the purposes of discussion and ease of understanding, "graphical interface element representing a user" may be used interchangeably with "avatar" below. Additionally, "gesture input" may be used interchangeably with "drag and drop" in the discussion below.

FIG. 1 illustrates a system 100 for implementing aspects of the present disclosure. As mentioned above, the system 100 can enhance the user experience and improve the efficiency of a computing device 104A by enabling a user 102A to initiate a communication session using a gesture input 106. As discussed above, the gesture input can be a drag and drop input that moves an avatar to a file. In other embodiments, user 102A may alternatively use a voice input 108 or video input 110 to initiate a communication session. In still other embodiments, user 102A may use gesture input 106, voice input 108, and video input 110 in combination as part of input data 112 to initiate a communication session.

In response to receiving input data 112 indicating graphical movement of a virtual avatar to a file, the system 100 can modify permission data 114 to begin initiating a communication session. For instance, gesture input 106 may indicate user 102A has graphically moved avatars for user 102B and user 102C into a file 116 to initiate a communication session. Permission data 114 for user 102B and user 102C can be modified to allow each user 102 to participate in the communication session and view the file that is shared by user 102A. As will be elaborated upon below, computing device 104A can store a permission data structure for each participant in a communication session. Users 102B and 102C may also be granted permission by user 102A to edit file 116 which will be discussed in greater detail below. It should also be understood that while the example illustrated in FIG. 1 displays three users 102A-102C, the system 100 can include any number of users 102.

Once each user 102 is configured with the proper permissions, computing device 104A can then initiate a communication session with computing devices 104B and 104C that are each associated with a second user 102B and a third user 102C respectively. Transmitted communication data 116 can include input data 112 such as voice input 108 and video input 110 as well as screen sharing data of the file 116 selected by gesture input 106. As will be discussed below, transmitted communication data 118 can also include text messages generated by user 102A. Similarly received communication data 120 can include voice and/or video data as well as text messages generated by users 102B and 102C. In addition, if user 102B and 102C have been granted permission, received communication data 120 can also include changes made to file 116. Changes made by users 102 can be collected as editing data 122 that are applied to the file 116.

Turning now to FIG. 2A, aspects of an example user interface 200 are shown and described. As shown by the depiction of user 102A, user interface 200 illustrates the perspective of user 102A who is the user who initiates a communication session as discussed above with respect to FIG. 1. It should be understood that user interface 200 can be any suitable environment for displaying the various aspects of the communication and collaboration platform shown in FIG. 2A such as a rendering of an application window, mobile device home screen, and the like. In a specific example, user interface 200 may be an operating system desktop environment of computing device 104A that belongs to user 102A. In this example, the desktop environment of user interface 200 may be configured by user 102A to allow other users 102B and 102C to access remotely. In this way, user interface 200 can serve as a virtual social space where multiple users 102 can congregate. To manage the shared desktop space of user interface 200, the system 100 can provide a task bar 202 containing various graphical interface elements 204A-204H. Specifically, a give control element 204A allows user 102A to grant control of the desktop user interface 200 to other users 102B or 102C while the stop presenting element 204B enables user 102A to revoke remote access or viewing of the desktop user interface 200. Element 204C can be selected by the user 102A to view a list of users 102 currently in the virtual desktop space of user interface 200. An element 204D can enable the user 102A to access chat functionality with other users 102 in the virtual space or other users 102 that are not in the virtual space. Task bar 202 can also include a video on/off element 204E to enable the user 102A to control whether video is streamed from the computing device 104A to other users 102B or 102C, an audio on/off element 204F to enable user 102A to control whether audio is streamed from the computing device 104A to other users 102B or 102C. In addition, a share control element 204G can enable user 102A to access various items for sharing in the virtual space of user interface 200 such as multimedia content. A "hang up" element 204H can enable the user 102A to exit the space which can optionally remove other users 102 from the space as well.

To interact within the virtual space, each user 102 can be represented by an associated graphical user interface element or avatar. For instance, user 102A can be represented by profile picture icon 102A' that is displayed alongside a cursor 206 to indicate that the cursor 206 belongs to user 102A. As shown in FIG. 2A, user 102A is currently being visited by user 102B and user 102C who are represented in user interface 200 by avatars 102B' and 102C' respectively. Avatars can be customized by associated users 102 to their liking. For instance, users 102 can select physical appearances, clothing items, and the like. In other embodiments, avatars can be automatically generated to bear a resemblance to the real-world appearance of the associated user 102.

When appearing in the virtual space of user interface 200, each avatar 206 can be displayed concurrently with various icons or graphical elements to indicate a current status of each user 102. For example, avatar 102B' can be displayed wearing a rain jacket while animated elements 208 depicting rain fall to indicate that it is currently raining where user 102B is located. Similarly, avatar 102C' can be displayed in conjunction with graphical elements of a moon and stars 210 to indicate that it is currently evening for user 102C. In addition, a briefcase icon 212 can indicate that use 102C is currently still at work. Furthermore, a text prompt 214 can provide user 102A with explicit context suggested by the moon and stars icons 210 and the briefcase icon 212.

Within the virtual space of user interface 200, users 102 can send chat messages that are displayed alongside their associated avatar 206. For example, user 102B greets user 102A with a message 216 to which user 102A responds with a message 218. This conversation is displayed concurrently with avatar 102B' to remind user 102A that they are speaking to user 102B. Subsequently, user 102C enters the virtual space with and avatar 102C'. Accordingly, user 102A shifts focus to a message 220 sent by user 102C inquiring about a document 116. As shown in FIG. 2A, avatar 102C' is displayed in the foreground of user interface 200 while avatar 102B' is in the background. Additionally, in response to user 102A shifting focus to message 220, messages 216 and 218 are displayed with a transparency effect applied to indicate that user 102A is not currently focused on the previous conversation. It should be understood that shifted focus can be detected in any suitable way. For instance, user 102A may utilize cursor 206 to select message 220 which can be interpreted as a shifting focus. In another example, video input 110 may indicate that user 102A has shifted their gaze from avatar 102B' to avatar 102C'. In response, the transparency effect can be applied to messages 216 and 218 while avatar 102C' is moved to the foreground. In response to message 220, user 102A can reply with a message 222 which takes into account the context provided by various graphical elements 208-214.

By communicating in context user interactions can be enriched leading to a positive user experience and increased productivity. As shown in FIG. 2A, users 102 can share meaningful interactions within the virtual space of user interface 200 without opening a communication application or separate chat interface. As such, the virtual space of user interface 200 can emulate the real-life sensation of several people sharing a physical space and speaking to each other while collaborating on various topics such as file 116.

Figure 2B:
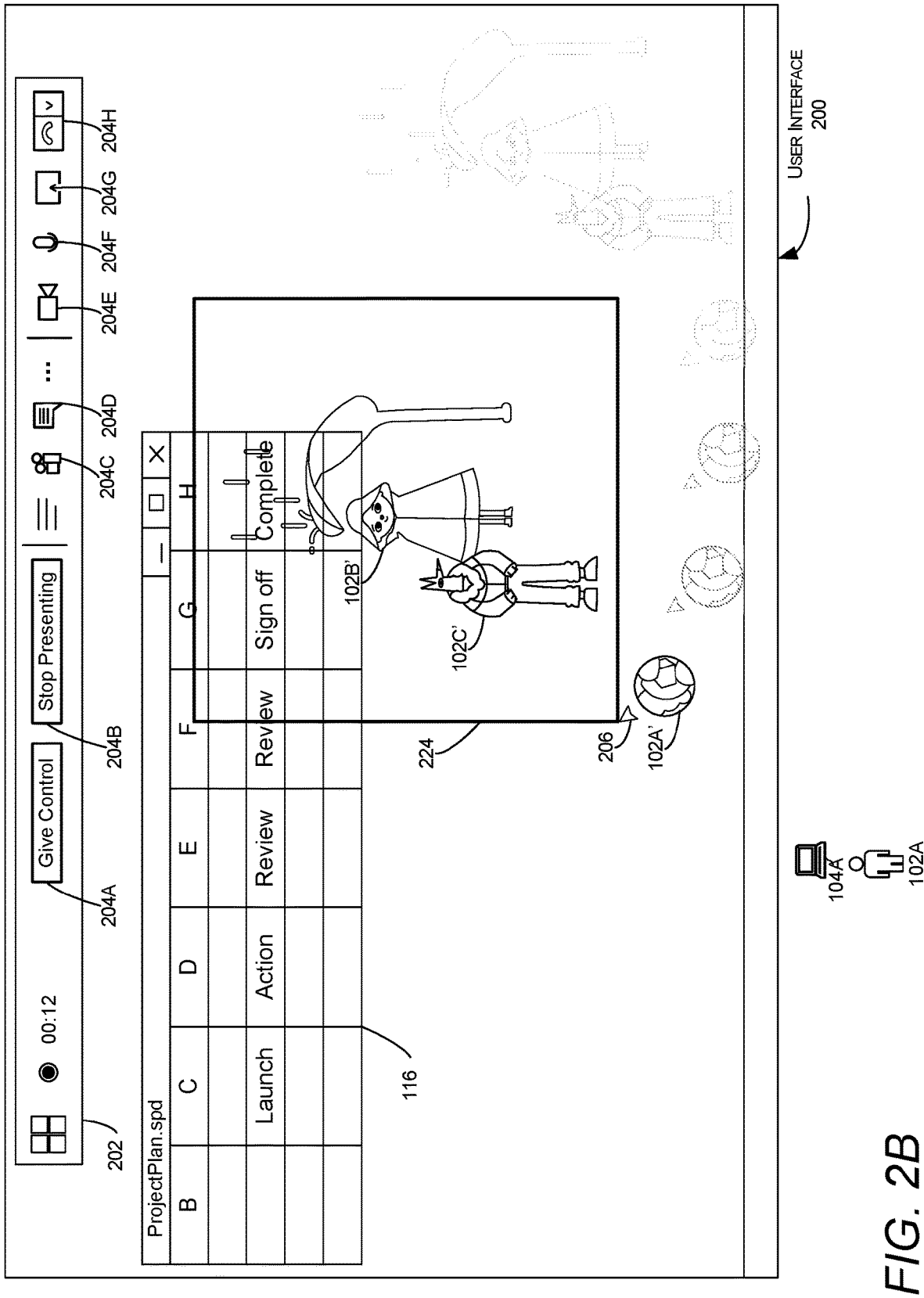
FIG. 2B shows the example user interface in a second step of a process for initiating a communication session using a gesture input.

Proceeding now to FIG. 2B, user 102B has selected avatars 102B' and 102C' within a bounding box 224. Selecting one or several avatars 102B' and 102C' within bounding box 224 can be accomplished using any suitable input method such as a clicking and dragging with a mouse, touch input, or other input device. Alternatively, user 102A may individually select each avatar such as through a shift click input. In still another example, user 102A may use a voice input 108 to instruct computing device 104A to select avatars 102B' and 102C'.

One avatars 102B' and 102C' are selected, user 102A can proceed to perform a gesture input 106. As mentioned above, user 102A can use gesture input 106 to move avatars 102B' and 102C' about the virtual space of user interface 200. As shown in FIG. 2B, user 102A can drag and drop the group of avatars 102B' and 102C' into a file 116 to initiate a communication session with screen sharing features. In this example, file 116 is illustrated as a spreadsheet, however it should be appreciated that file 116 can be any file type such as a text document, multimedia content, website, and so forth. As with the chat features shown in FIG. 2A, the techniques described herein enable user 102A to initiate screen sharing without opening a separate communication application thereby maintaining engagement with other user 102B and 102C. In another example, the system 100 may detect that user 102C has mentioned a document such as in message 220 and determine based on the context that users 102A, 102B, and 102C are collaborators. In response, the system 100 can search computing device 104A for files 116 which users 102A, 102B, and 102C have worked on together and display a suggested document to user 102A.

Figure 2C:
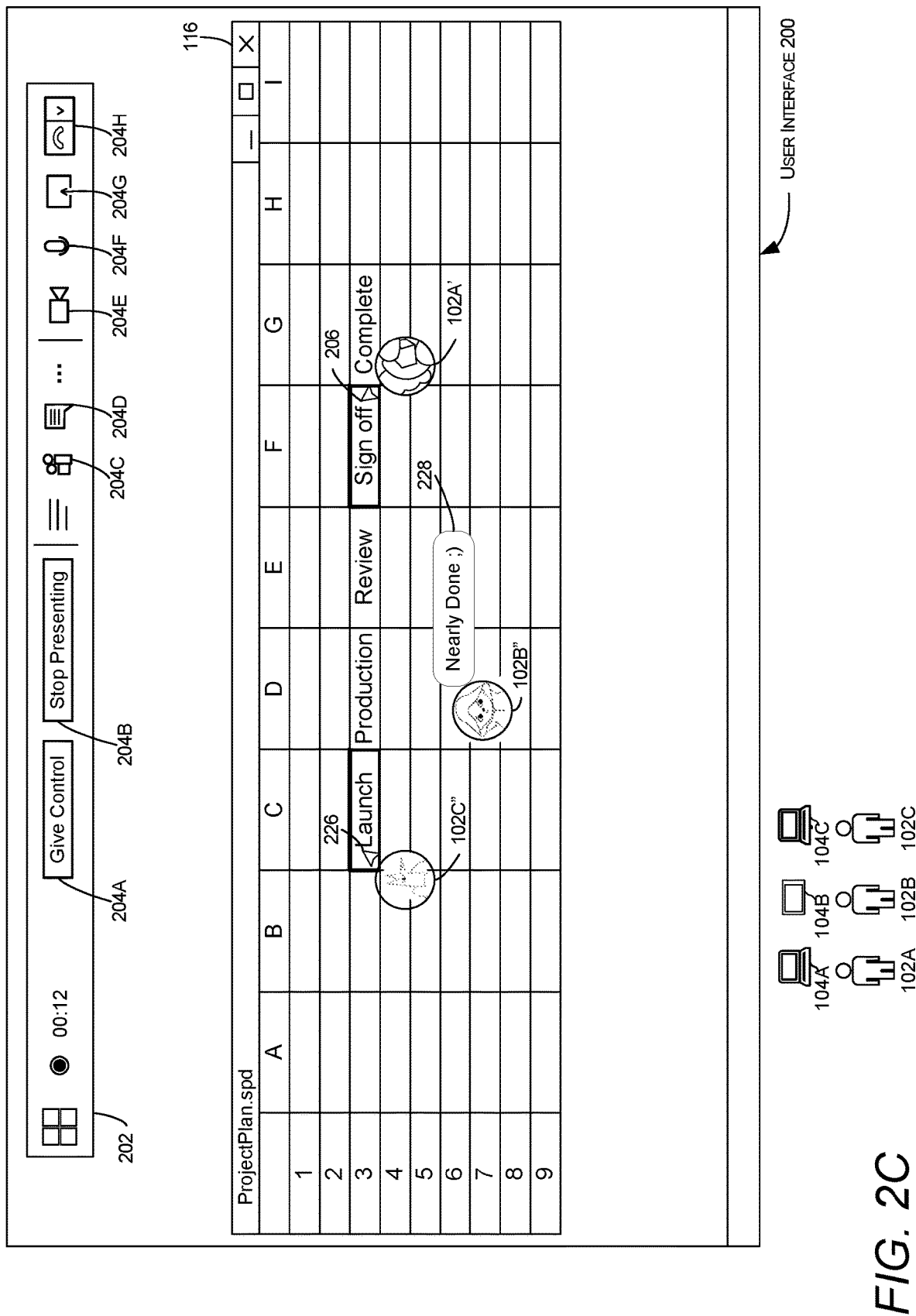
FIG. 2C shows the example user interface in a third step of a process for initiating a communication session using a gesture input.

Turning now to FIG. 2C, in response to the drag and drop gesture input 106, the virtual social space of user interface 200 has now transitioned to a different shared space which can be a communication session utilizing screen sharing functionality. As will be elaborated upon further below, permission data associated with each visiting user 102B and 102C can be modified to allow each user 102 to view and/or edit the file 116. As with the examples discussed above with respect to FIGS. 2A and 2B, reorganizing the process of sharing a file 116 as a movement between spaces rather than a list of discrete operations can lead to improvements in user experience, increased productivity, and more efficient use of computing resources.

As shown in FIG. 2C, each user 102 within the file 116 controls a respective cursor 206 and 226. In addition, avatars 102B' and 102C' are now modified to display as icons 102B" and 102C" respectively. Each icon 102B" and 102C" can be displayed concurrently with a cursor 226 similar to the icon 102A' and cursor 206 of user 102A. As with the virtual social spaces of FIG. 2A, users 102 can send chat messages 228 within the shared view of the file 116 which are displayed concurrently with the icon 102B" of the user 102B that sent the message 228. Integrating communication functionalities such as chat directly into the shared space of the file 116 enables users 102 to maintain engagement with the task at hand without opening a separate chat window or other application.

Figure 3A:
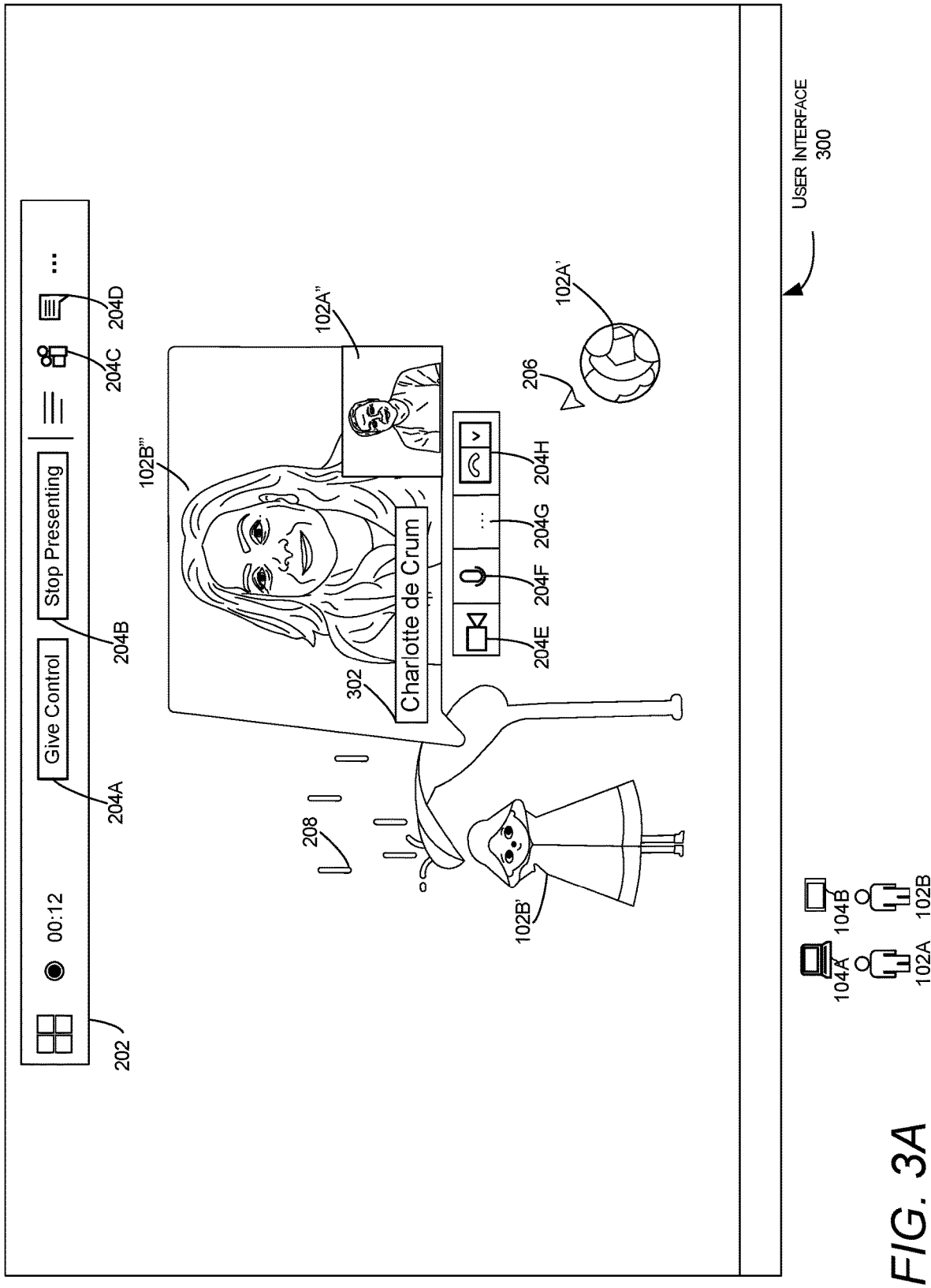
FIG. 3A shows another example user interface in a first step of a process for initiating a communication session using a gesture input.

Proceeding now to FIG. 3A, various aspects of another example user interface 300 of the present disclosure are shown and described. Similar to the example of FIG. 2A, user 102A has configured the desktop space of user interface 300 to receive a visiting user 102B who is represented by an avatar 102B'. However, user 102B has elected to use video functionality in her visit with user 102A. Accordingly, a video stream 102B''' depicting a rendering of user 102B can be displayed concurrently with avatar 102B' to associate the real-life view of user 102B with her virtual avatar 102B'. A nametag 302 can be displayed within video stream 102B''' to identify user 102B as well. In addition, a second rendering of a video stream 102A" depicting user 102A can be displayed within the first video stream 102B'''. Furthermore, various user interface elements 204E-204H for controlling video communications can be relocated from the task bar 202 to a second location near the video stream 102B'''. As with the chat messages 216-222 shown in FIG. 2A, displaying video streams 102B''' and 102A" can enrich the user experience thereby increasing engagement removing the need to access separate applications.

Figure 3B:
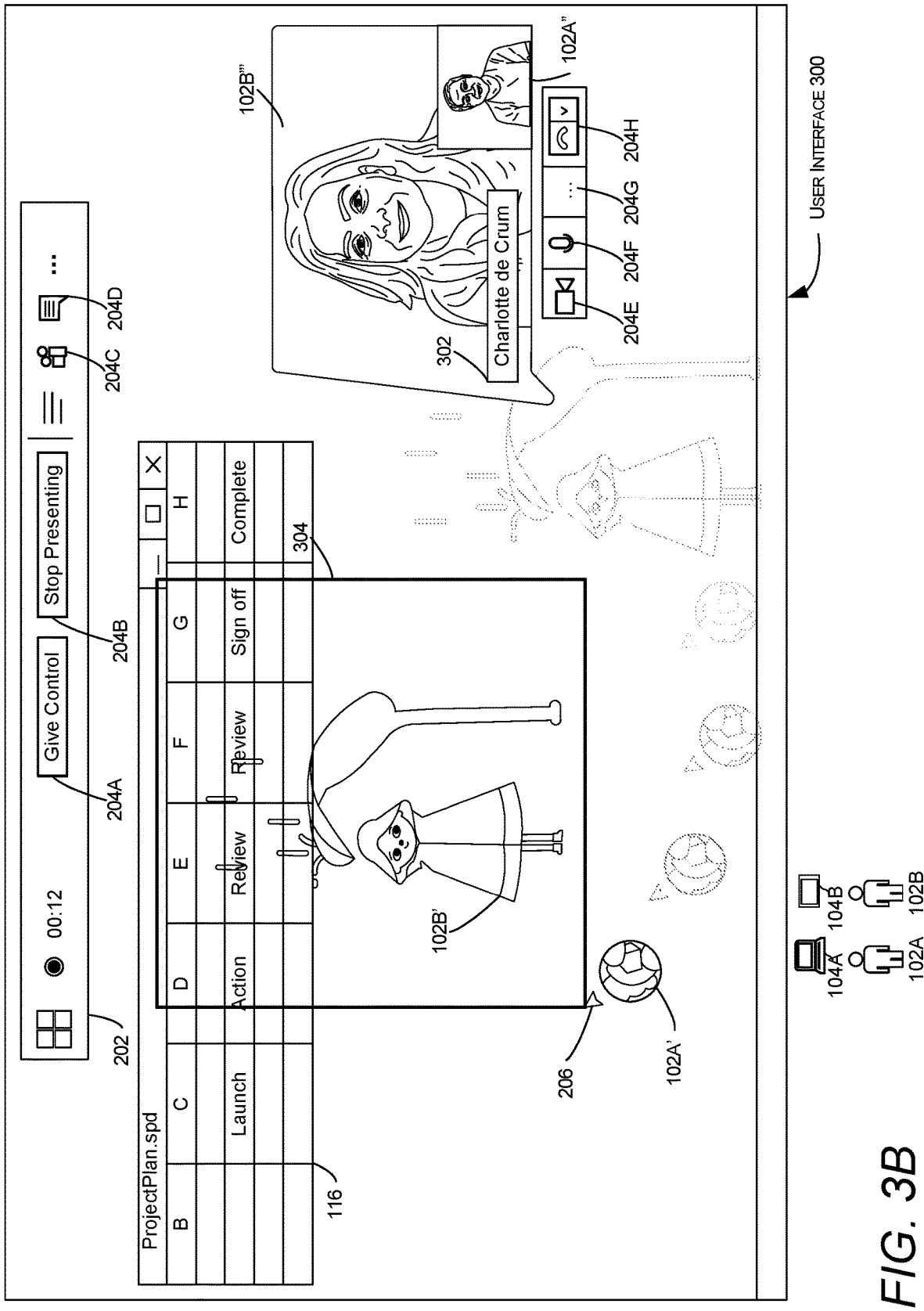
FIG. 3B shows the other example user interface in a second step of a process for initiating a communication session using a gesture input.

Like in the example of FIG. 2B, as shown in FIG. 3B, user 102A can enclose avatar 102B' within a bounding box 304 to select the avatar 102B'. Using cursor 206, user 102A can proceed to perform a drag and drop gesture input 106 to move avatar 102B' to file 116 to select the file 116 for sharing with user 102B. As shown in FIG. 3B, renderings of video streams 102B''' and 102A" remain visible while user 102A performs gesture input 106 to initiate screen sharing with use 102B. In this way, user 102A and 102B can maintain engagement while the communication session with screen sharing of file 116 begins.

Figure 3C:
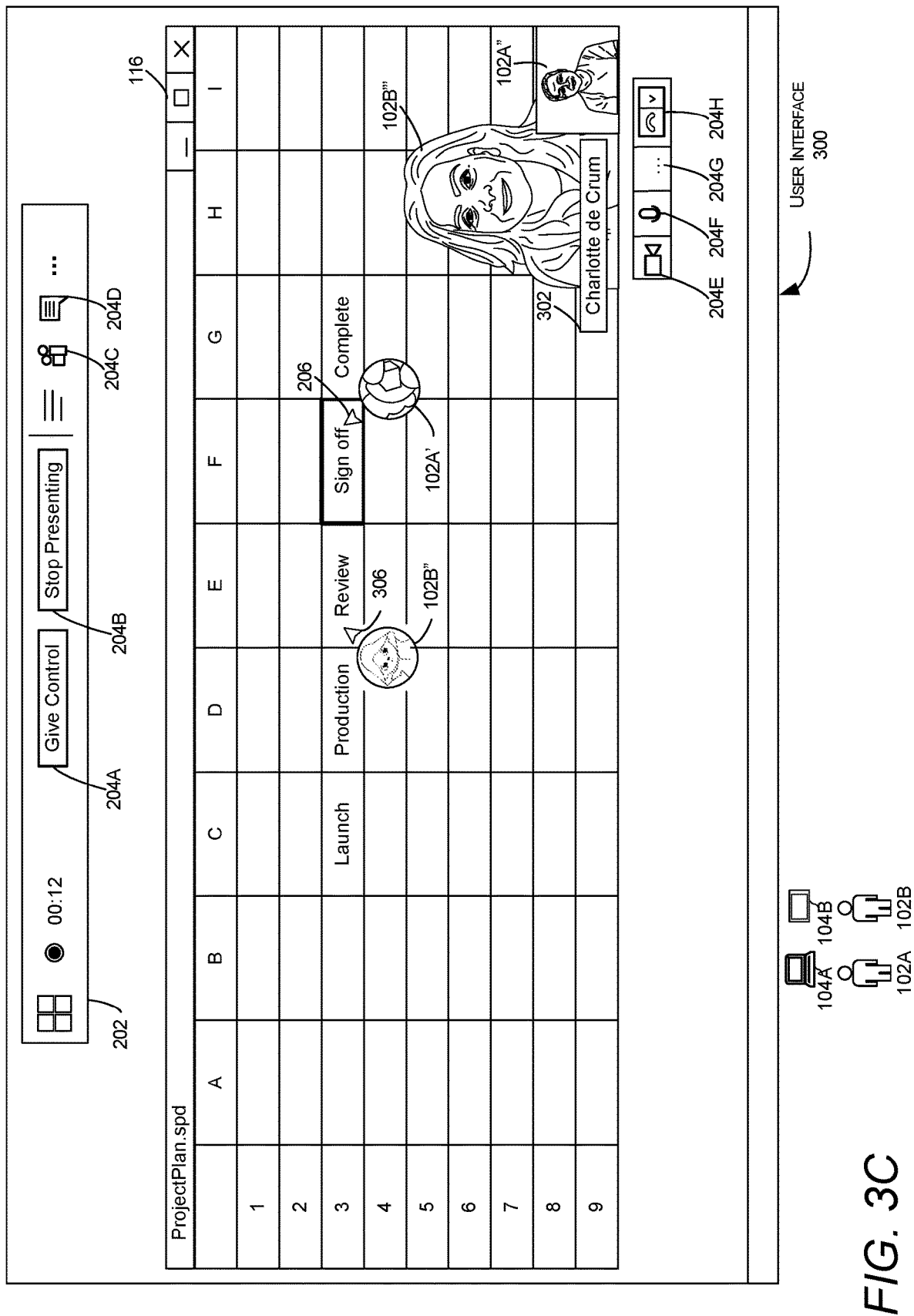
FIG. 3C shows the other example user interface in a third step of a process for initiating a communication session using a gesture input.

Turning now to FIG. 3C, in response to the gesture input 106 selecting the file 116, the system 100 has initiated a communication session with a shared view of file 116. Like the example of FIG. 2C, user interface 300 has transitioned to a new shared space enabling viewing of the file 116. In the new shared space, avatar 102B' is transformed into an icon 102B" that is associated with a cursor 306 as discussed above. In addition, as shown in FIG. 3C, a rendering of video stream 102B''' depicting user 102B and video stream 102A" depicting user 102A are not displayed within a separate window or application. Rather video streams 102B''' and 102A" are displayed concurrently within the shared view of file 116. In this way, user 102A and 102B can maintain engagement with each other via video chat while working on the file 116.

Figure 4A:
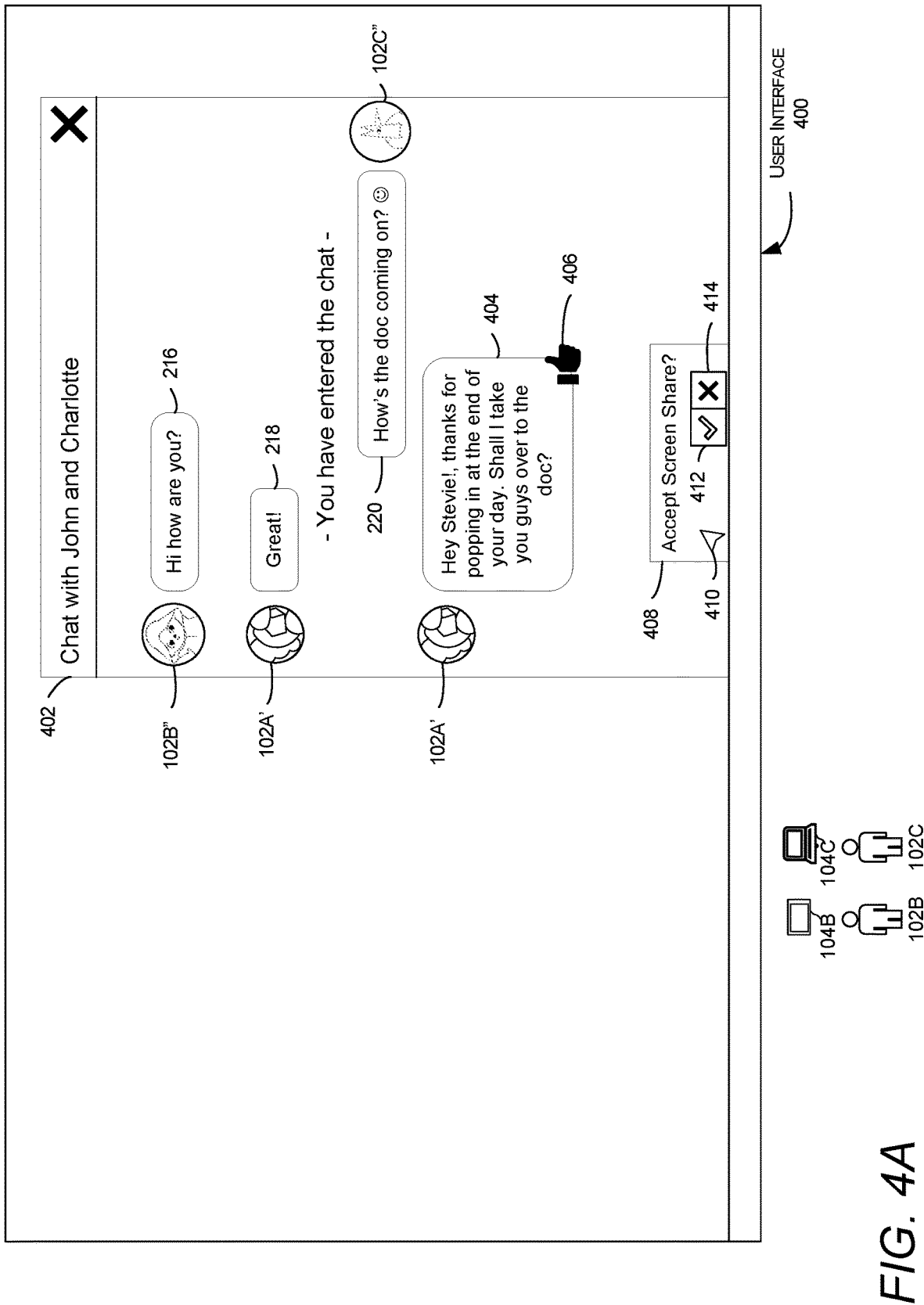
FIG. 4A shows an example user interface in a first step of a process for joining a communication session initiated using a gesture input.

Proceeding to FIG. 4A, aspects of an example user interface 400 are shown and described. As indicated by the depiction of user 102C, FIG. 4A depicts the perspective of user 102C via computing device 104C. In various examples, user interface 400 can be a rendering of an application window, a mobile device home screen, an operating system desktop environment, and the like. As shown in FIG. 4A, users 102A, 102B, and 102C are participating in a group text chat 402. User 102C joins the chat and inquires about a document via a message 220. In response, user 102A replies with a message 404 offering to take user 102B and 102C over to the document (e.g., file 116). User 102B and 102C can reply in the affirmative by attaching an icon 406 to message 404 within the chat 402. Accordingly, user 102A can initiate a communication session using a gesture input 106 to drag and drop avatar icons 102B" and 102C" from the chat 402 to a file 116 at their computing device 104A. In response, a notification 408 can be displayed to user 102C at computing device 104C to request confirmation from user 102C to accept or deny the communication session initiated by user 102A. Using a cursor 410 user 102C can select user interface element 412 or 414 to accept or deny the communication session respectively.

Figure 4B:
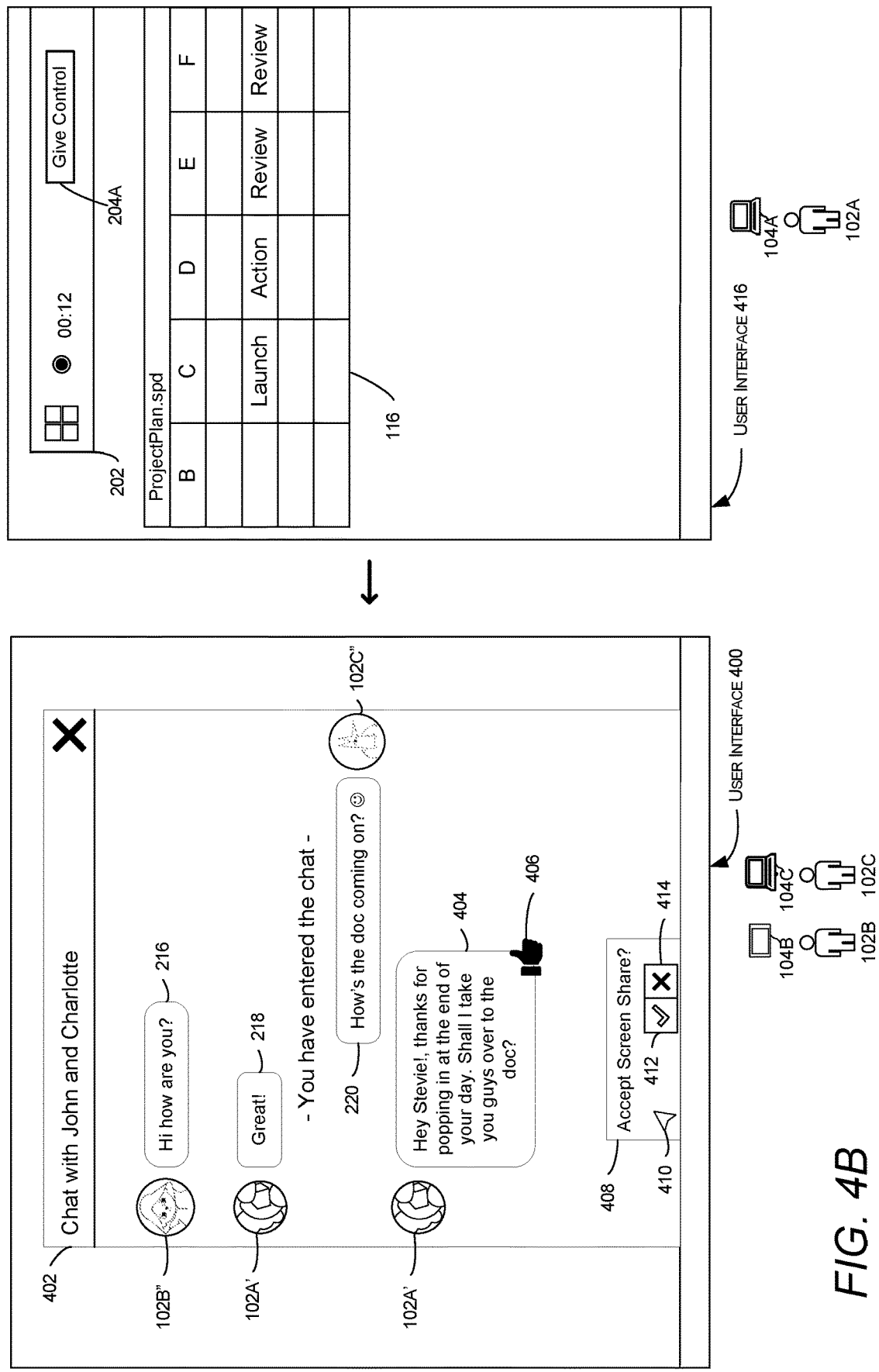
FIG. 4B shows the example user interface in a second step of a process for joining a communication session initiated using a gesture input.

Turning now to FIG. 4B, in response to user 102C accepting the communication session, user interface 400 is visually removed from view at computing device 104C and replaced with user interface 416. User interface 416 can be a shared space where user 102A, 102B, and 102C can freely interact via their associated avatars 102B' and 102C'. For instance, user interface 416 can be the user interface 200 in FIG. 2C in which users 102A, 102B, and 102C can jointly view a file 116 and interact. In another example, user interface 416 can be the shared social space as shown in user interface 200 in FIG. 2A. In this example, user 102C may see the action of user 102A performing gesture input 106 to initiate the screen share of file 116. In this way, the system 100 can reinforce the notion of a user 102 moving through spaces rather than simply swapping application displays.

Figure 4C:
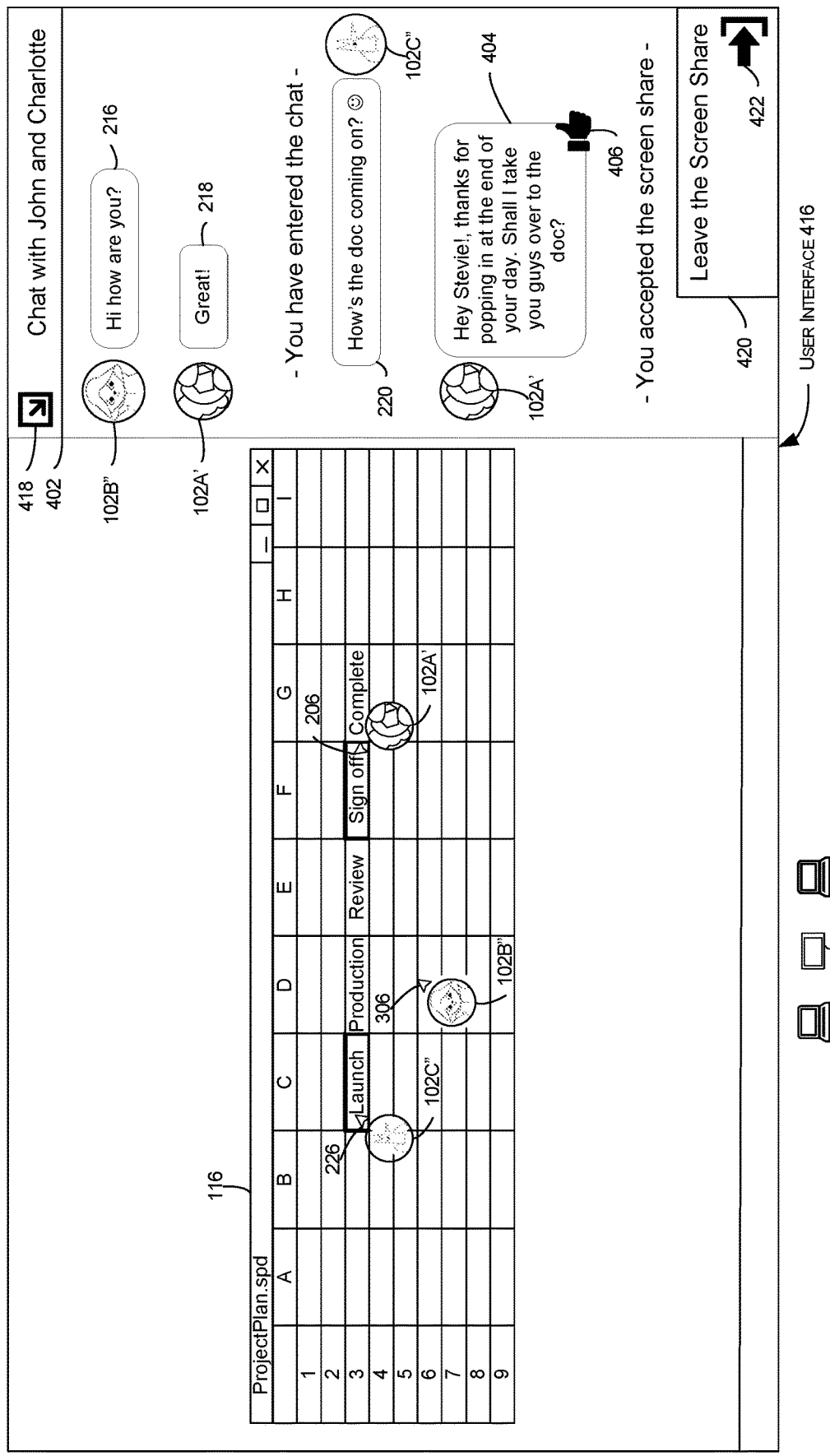
FIG. 4C shows the example user interface in a third step of a process for joining a communication session initiated using a gesture input.

Proceeding then to FIG. 4C, users 102A, 102B, and 102C can now participate in the shared view of file 116. Similar to the example discussed above with respect to FIG. 2C, each user 102 can be represented within the screen share space by an avatar icon 102A', 102B", and 102C"' that is displayed concurrently with a cursor 206, 226, or 306 respectively to enable each user 102 to interact with the file 116 and indicate a position of each user 102 within the file 116. As with user interface 400, user interface 416 can be a rendering of an application window, a mobile device home screen, an operating system desktop environment, and the like.

Furthermore, text chat 402 can be relocated to a portion of the user interface 416 to display concurrently with the shared view of file 116. The relocated chat 402 can include additional user interface elements based on the context in which the chat 402 is displayed. For instance, user 102C can select user interface element 418 to hide the chat 402 from view to access a maximized view of the file 116. In addition, a banner 420 and corresponding user interface element 422 can be displayed within the chat 402 to enable user 102C to leave the shared space of user interface 416. However, as will be discussed below, leaving the shared space does not necessarily mean user 102C has left the communication session and can enable user 102C to utilize additional functionality of the communication and collaboration platform.

Figure 4D:
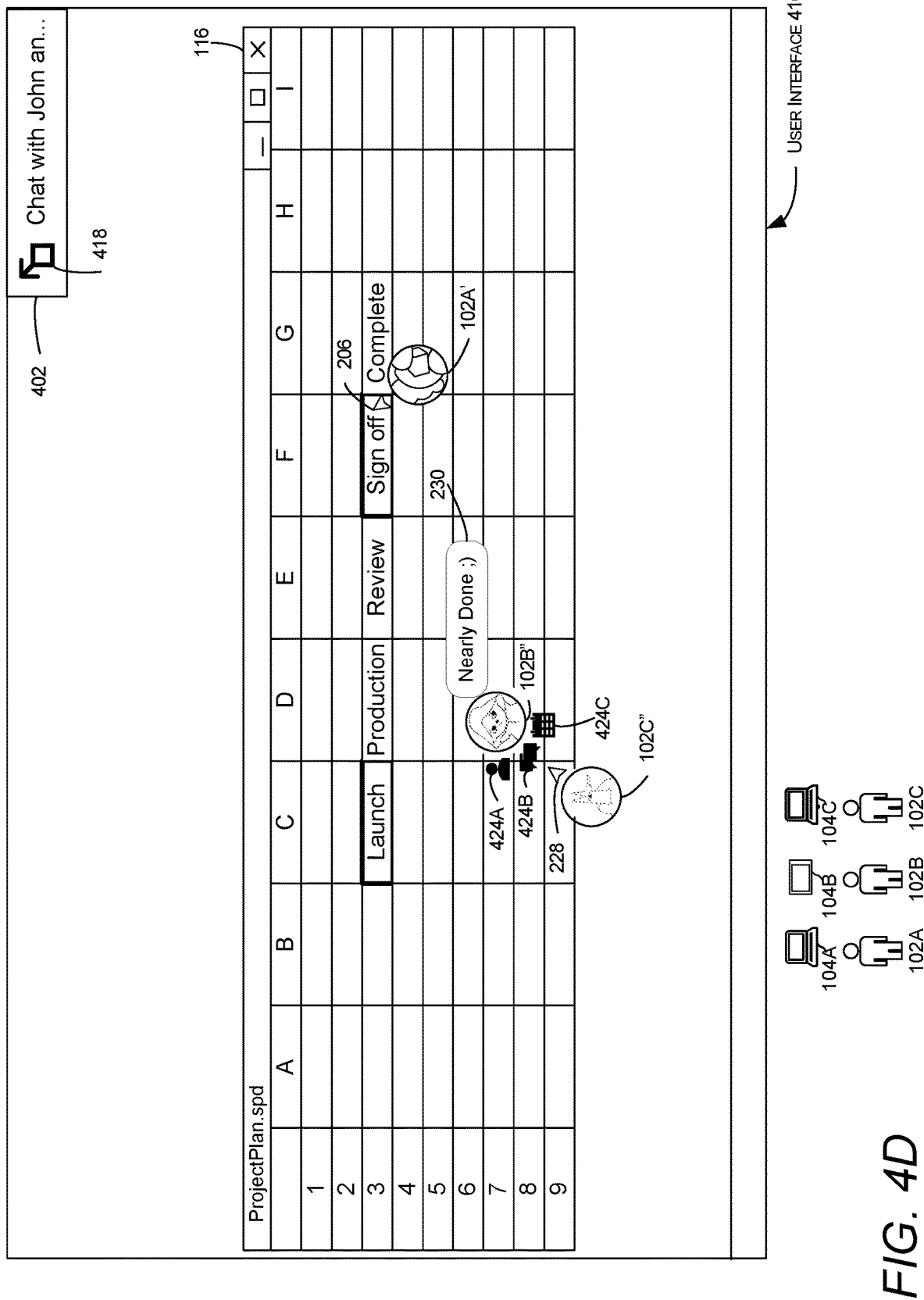
FIG. 4D shows the example user interface in a fourth step of a process for joining a communication session initiated using a gesture input.

Turning now to FIG. 4D, additional aspects of the example user interface 416 are shown and described. As shown, by selecting user interface element 418 user 102C can hide the chat 402 from view to show a maximized view of the shared file 116. In addition, by moving cursor 226 within a threshold distance of another avatar icon 102B", user 102C can summon various icons that represent actions that can be taken with respect to user 102B who is associated with avatar icon 102B". In other examples, the icons 424 can be summoned in response to user 102C moving cursor 226 towards avatar 102B" with a speed and acceleration value that satisfies a threshold speed and acceleration. It should be understood that any suitable criteria can be used instead of or in addition to the ones mentioned above to summon the icons in response to a cursor movement towards an avatar 102B".

Selecting an icon 424 can enable user 102C to directly interact with user 102B. For instance, selecting icon 424A can cause a display of information pertaining to user 102B such as an email address, a phone number, a job title, and so forth. In another example, selecting icon 424B can enable user 102C to chat with user 102B privately (e.g., outside the shared space of user interface 416). Alternatively, selecting icon 424B can cause the system to automatically generate a message that is prepopulated with a mention of user 102B which user 102C can display within the shared space of user interface 416. In this way, user 102C can get the attention of user 102B without leaving the shared view of file 116. In still another example, selecting icon 424C can cause a display of a calendar of user 102B showing their availability if user 102C wishes to schedule a meeting for instance. It should be appreciated that the icons 424 shown and discussed with respect to FIG. 4D are merely examples and should not be construed as limiting. The system disclosed herein can be configured to surface any icons in response to a cursor movement towards an avatar 102B" that satisfies a threshold value such as distance, speed, and/or acceleration.

Figure 5A:
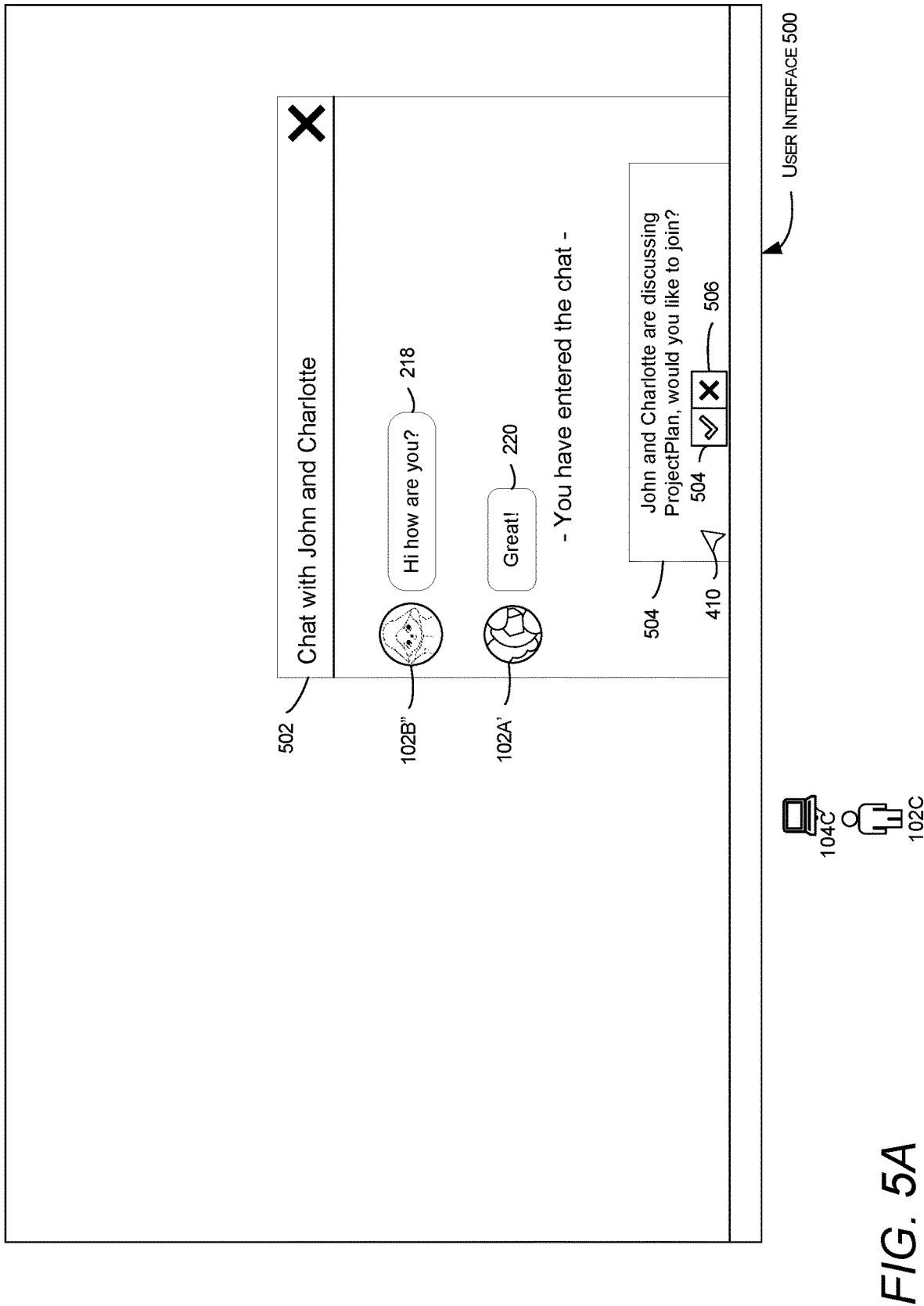
FIG. 5A shows another example user interface in a first step of a process for joining a communication session initiated using a gesture input.
Figure 5B:
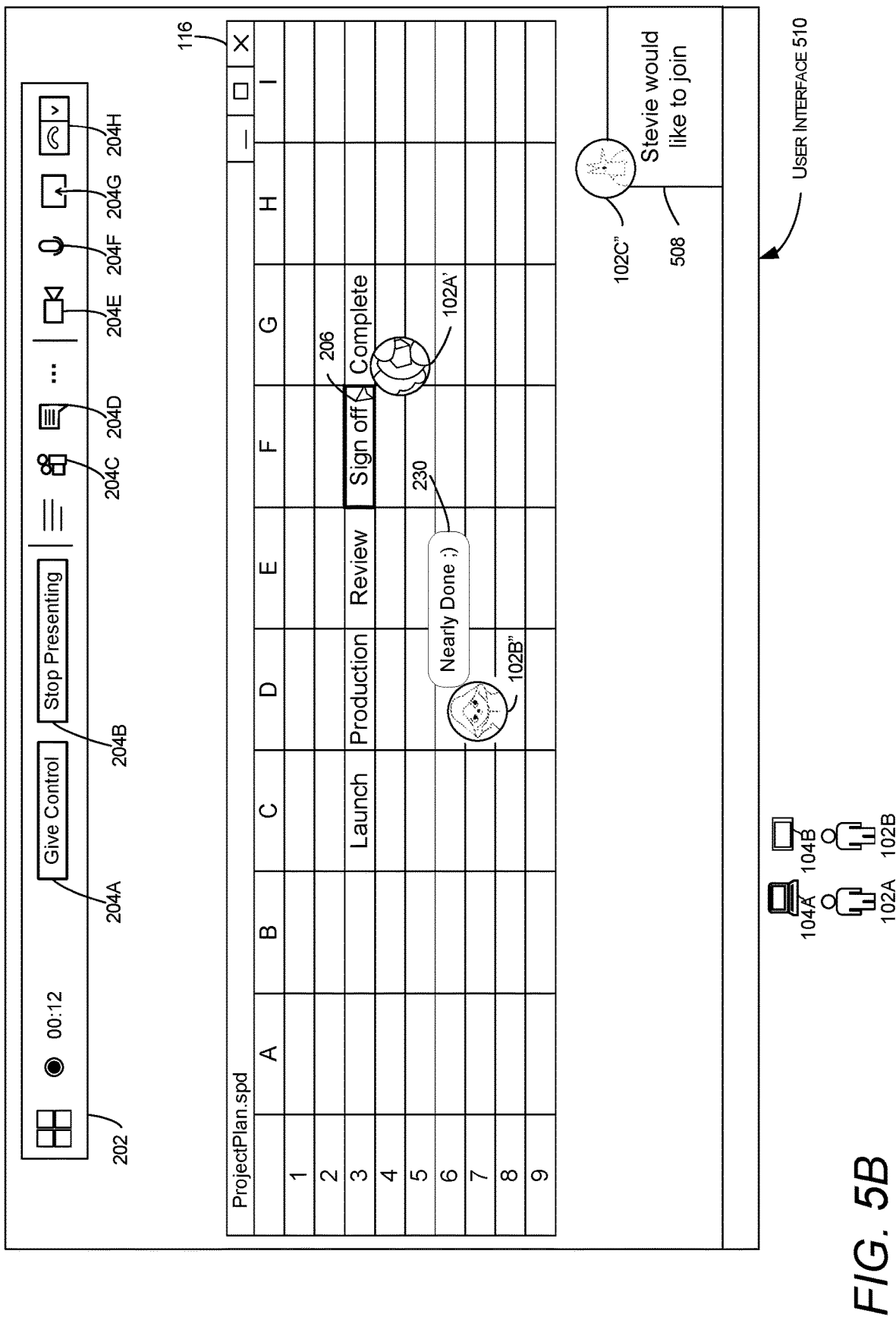
FIG. 5B shows the other example user interface in a second step of a process for joining a communication session initiated using a gesture input.

Turning now to FIG. 5B, aspects of another example user interface 500 are shown and described. As with FIG. 4A, FIG. 5A illustrates the perspective of user 102C who joins a communication session initiated by user 102A. In contrast to the examples discussed with respect to FIGS. 4A through 4D, user 102C joins a chat 502 while a communication session discussing file 116 between user 102A and 102B is ongoing. However, the system may detect that user 102C is also involved in work regarding the file 116 at hand. Accordingly, a notification 504 can be displayed inquiring as to whether user 102C would like to join the discussion. User 102C can accept or dismiss the notification by selecting user interface element 504 or 506 respectively.

Figure 5C:
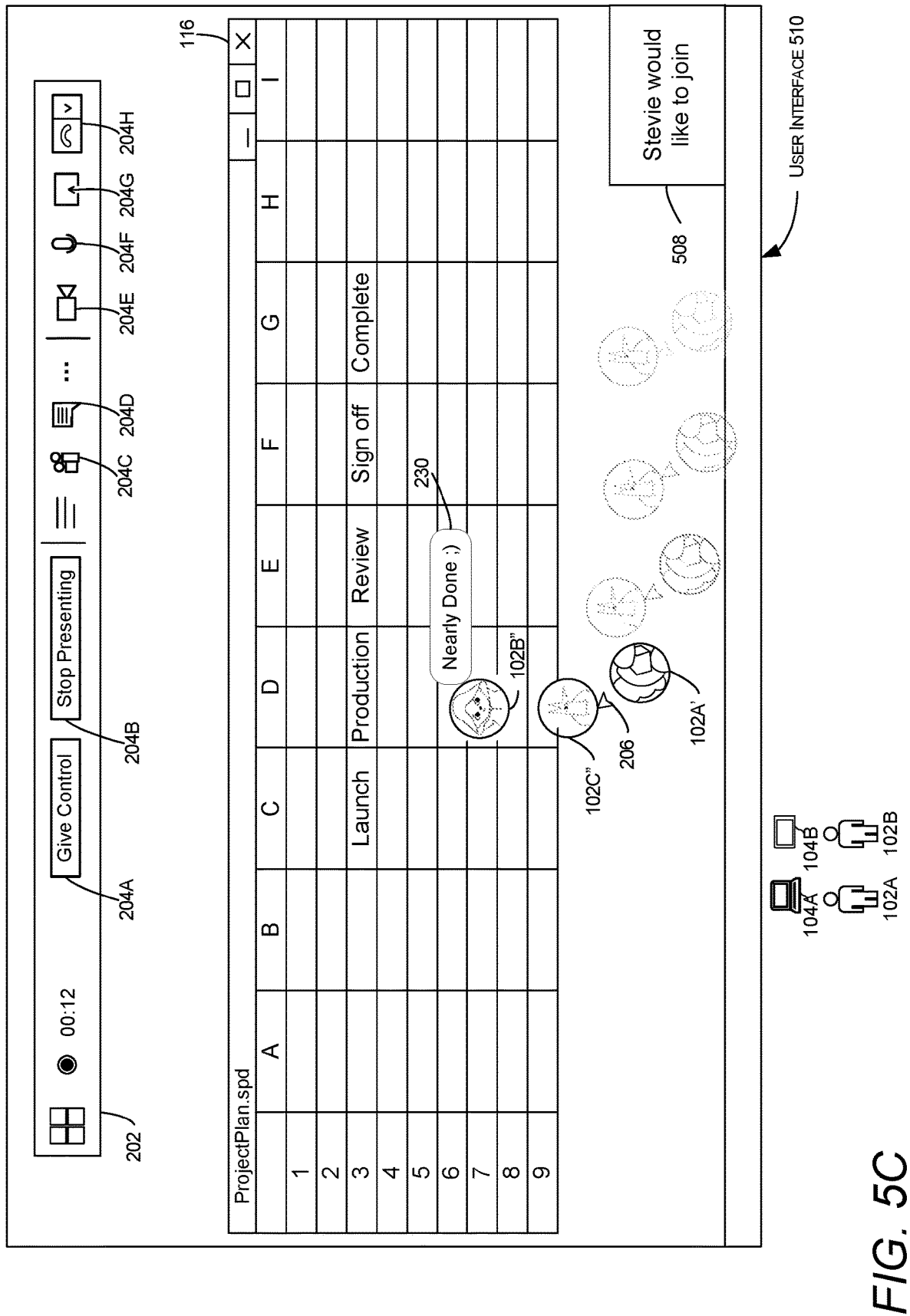
FIG. 5C shows the other example user interface in a third step of a process for joining a communication session initiated using a gesture input.
Figure 5D:
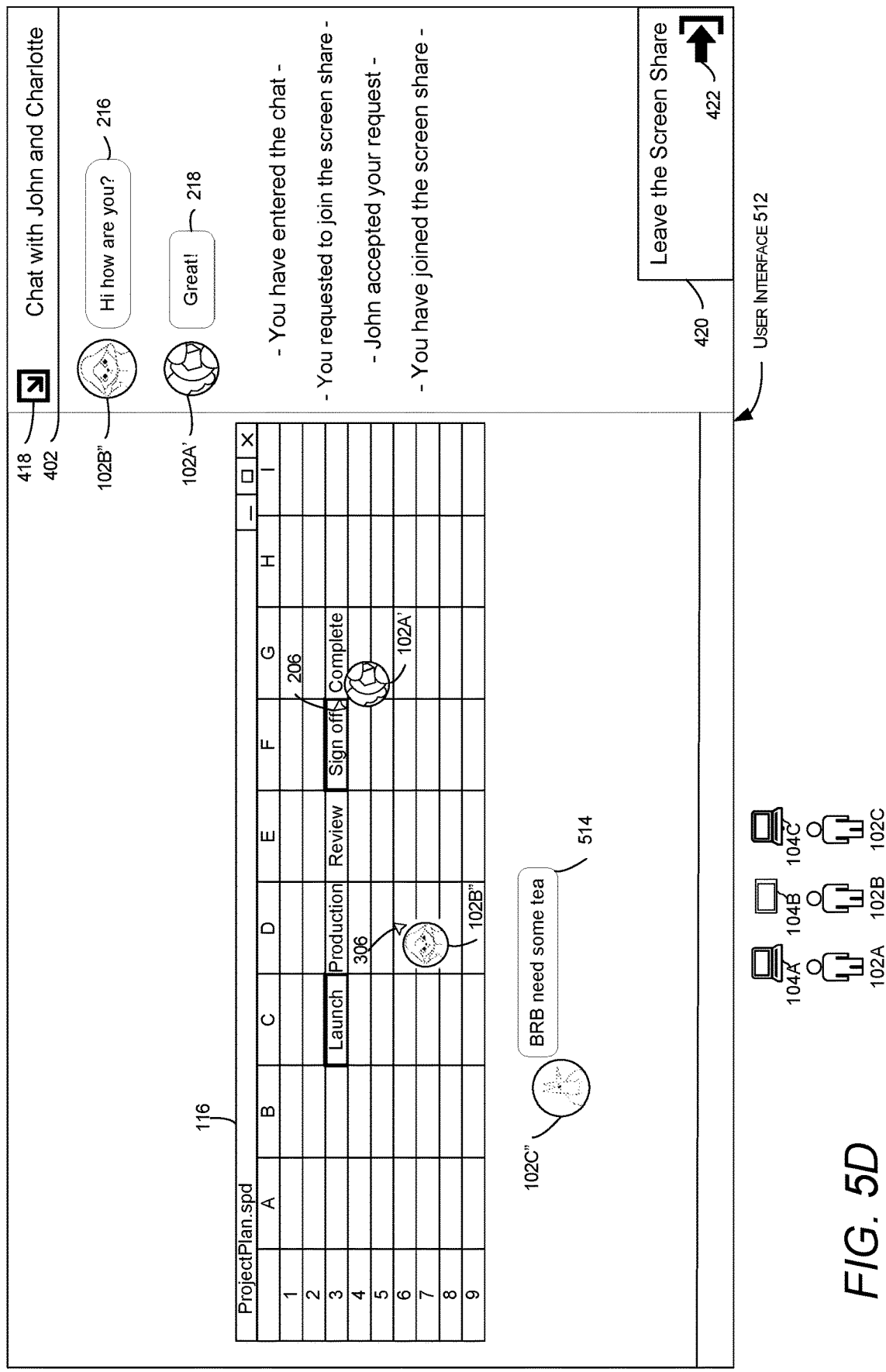
FIG. 5D shows the other example user interface in a fourth step of a process for joining a communication session initiated using a gesture input.

If user 102C decides to accept the notification, user 102A, who initiated the communication session by selecting file 116, can be presented with a notification in response. As shown in FIG. 5B, a notification 508 can appear in user interface 510 to inform user 102A that user 102C would like to join the communication session. A rendering of an avatar icon 102C" can be displayed concurrently with the notification 508. As shown in FIG. 5C, user 102A can proceed to drag and drop avatar icon 102C" from notification 508 to the file 116 to add user 102C to the communication session and grant him access to the file 116. In this way, a user 102A can be enabled to add users 102 to an ongoing communication session without opening a separate window or disrupting engagement with the communication session. Turning now to FIG. 5D, the perspective returns to that of user 102C after being added to the shared view of file 116. Like the examples discussed above with respect to FIG. 4A through 4D, in response to being added to a communication session, user interface 500 can transition to user interface 512 to move user 102C from their personal space in user interface 500 to the shared space of user interface 512.

As discussed above, user 102C can send a message 514 within the shared space that is displayed alongside their associated avatar icon 102C". In this example, user 102C notifies users 102A and 102B that they are leaving to make some tea. Accordingly, user 102C can select the "leave screen share" user interface element 422 to exit the shared space of user interface 512.

Figure 6A:
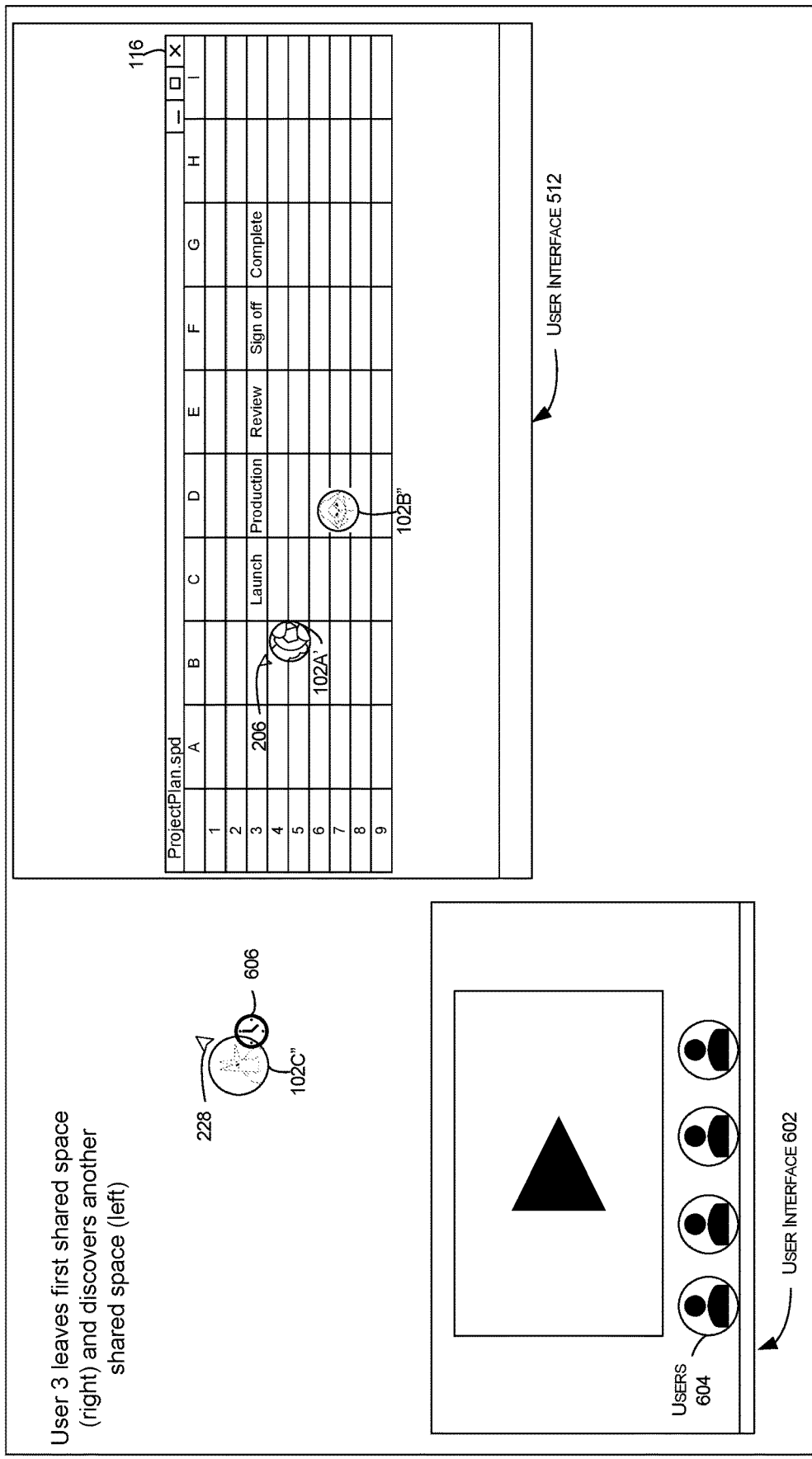
FIG. 6A shows an example user interface in a first step of a process for discovering and joining a second communication session.

Proceeding now to FIG. 6A, in response to user 102C selecting user interface element 422 to leave the shared space of user interface 512, the perspective of user 102C at computing device 104C then transitions to a new user interface 600 comprising a zoomed-out view of user interface 512 as well as another view of another shared space within a user interface 602 containing another group of users 604. In addition, while user 102C is making tea, an icon 606 can be displayed alongside their associated avatar icon 102C" to indicate that they are currently away. Accordingly, the space of user interface 600 may be closed to visitors. Stated another way, other users 102 may be restricted from entering the space of user interface 600 while user 102C is away.

Figure 6B:
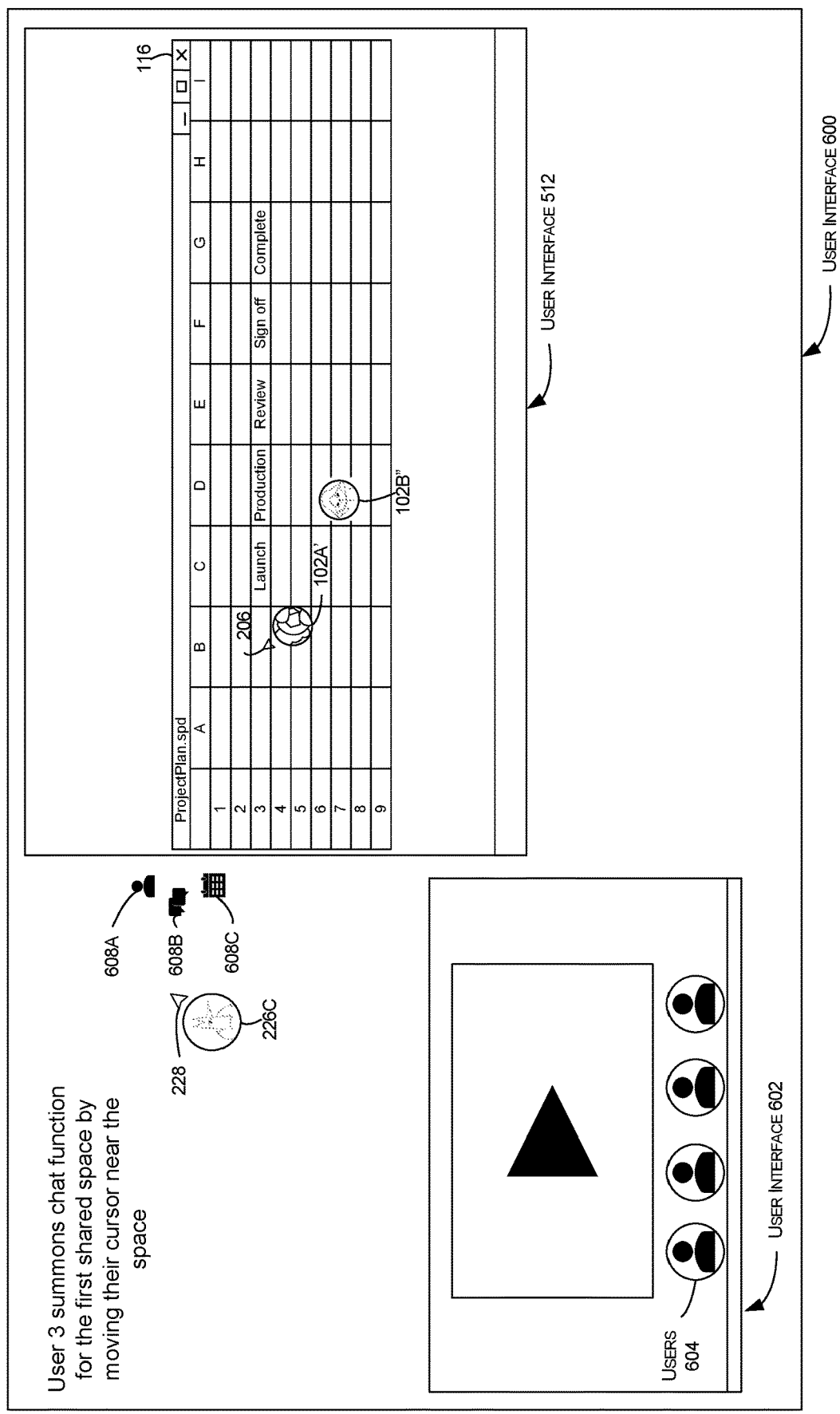
FIG. 6B shows the example user interface in a second step of a process for discovering and joining a second communication session.
Figure 6C:
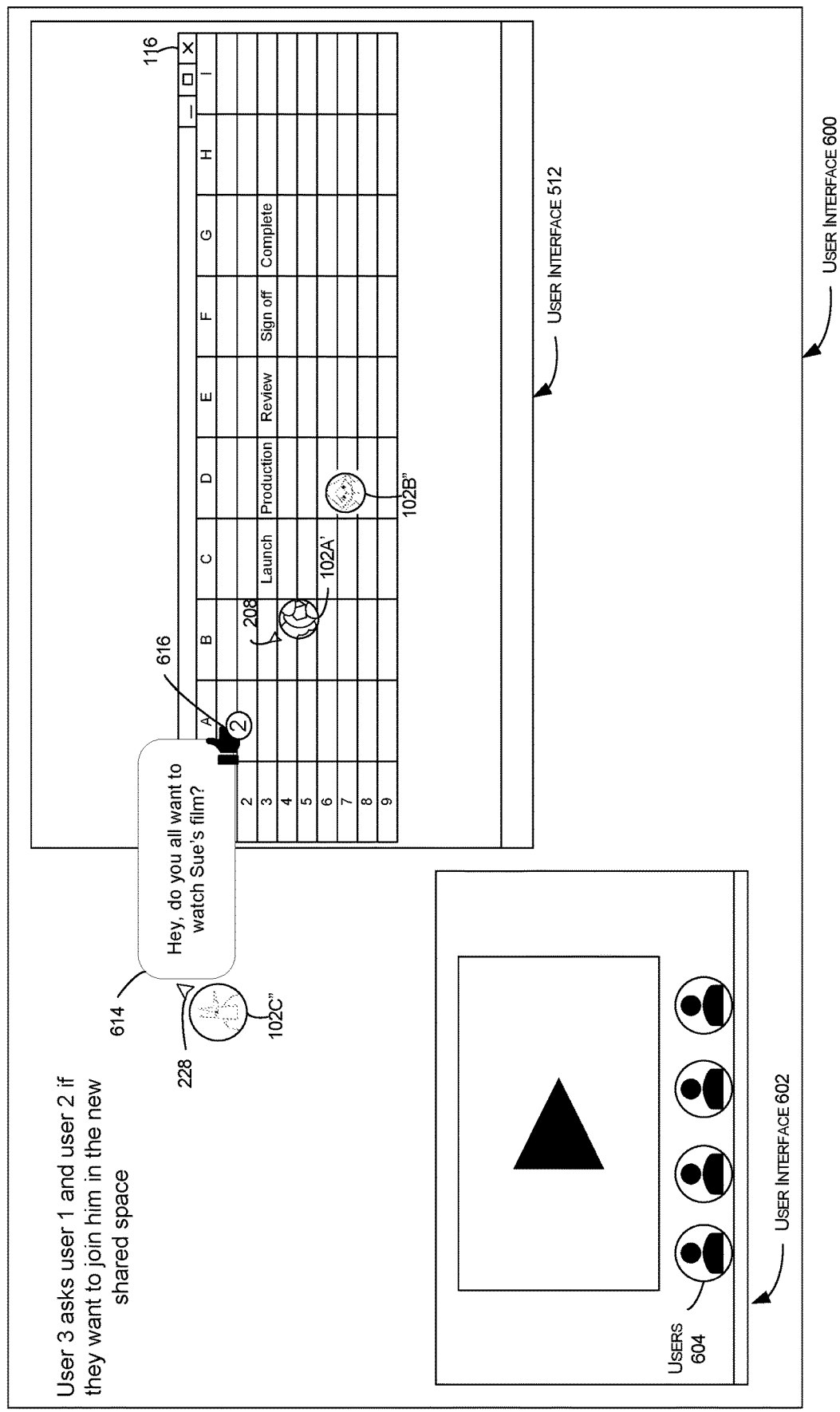
FIG. 6C shows the example user interface in a third step of a process for discovering and joining a second communication session.

In specific example, user 102C may return from their tea break and notice that the users 604 of user interface 602 are coworkers who are currently viewing a film. As shown in FIG. 6B, user 102C may proceed to summon various icons 608 associated with user interface 512 by moving their cursor 226 near the display of user interface 512. For instance, selecting icon 608A can enable user 102C to view a list of users 102 that are currently within the shared space of user interface 512, icon 608B can enable user 102C to send a message to the space for all users to see, and icon 608C can enable user 102C to view calendars and schedules for each user within user interface 512. Similar to the icons 424 discussed above with respect to FIG. 4D, any suitable thresholds such as distance, acceleration, and velocity can be used to detect whether user 102C intends to summon the icons 608 through 612. In addition, it should be understood the system can be configured to surface any suitable icons in response the movement of cursor 226 toward the rendering of user interface 512.

Figure 6D:
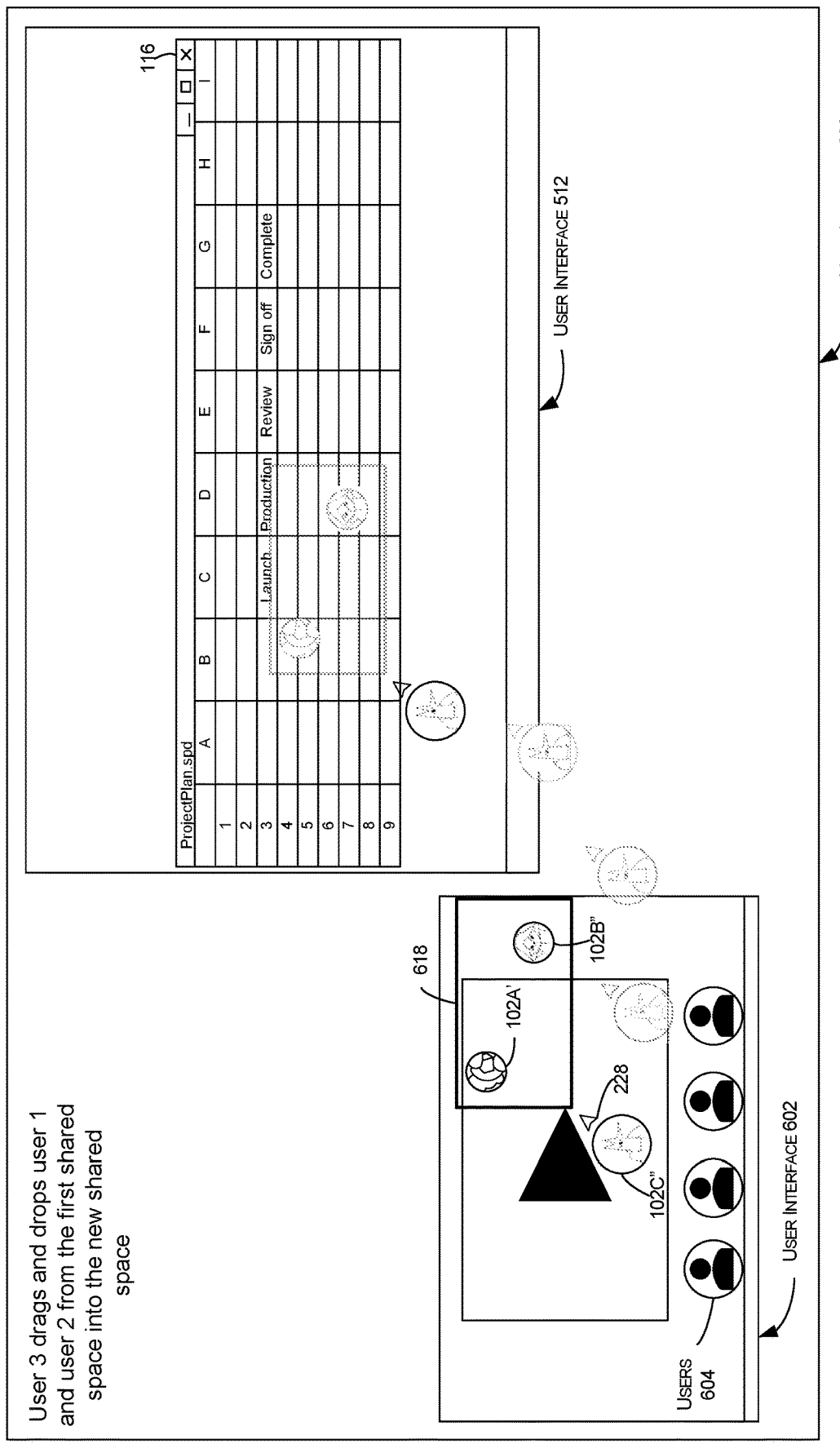
FIG. 6D shows the example user interface in a fourth step of a process for discovering and joining a second communication session.

Turning now to FIG. 6B, user 102C can select icon 610 and accordingly send a message inquiring as to whether user 102A and 102B wish to view the film in with the other users 604 in the shared space of user interface 602. In response to the message 614, user 102A and 102B can attach an icon indicating their approval along with a visual counter to show that both user 102A and 102B are agreeable to the request. Accordingly, user 102C can proceed to drag and drop the avatar icons 102A' and 102B" for users 102A and 102B into the shared space of user interface 602. As shown in FIG. 6D, user 102C can select both avatar icons 102A' and 102B" within a bounding box 618. As discussed above with regard to bounding box 224, selecting avatar icons 102A' and 102B" within bounding box 618 can be accomplished using any suitable input method such as a clicking and dragging with a mouse, touch input, or other input device. Alternatively, user 102C may individually select each avatar such as through a shift click input. In still another example, user 102C may use a voice input to instruct computing device 104C to select avatar icons 102A' and 102B". User 102C can subsequently drag the selected avatar icons 102A' and 102B" from the shared space user interface 512 to user interface 602 to add all three users 102A, 102B, and 102C to the new shared space to join users 604 in their premiere.

Turning now to FIG. 7A, aspects of a permissions management system 700 are shown and described. As described above, user 102A can use a gesture input 106 to initiate a communication session by dragging and dropping an avatar 102B' representing a user 102B into a file 116. Accordingly, the communication session can include a shared view of the content 702 contained within file 116 that was selected by the gesture input 106. In some configurations, the shared view can simply be a screen share in which a rendering of content 702 is transmitted from computing device 104A to other participants but the file 116 is not itself transmitted. In other configurations, user 102A may elect to share the file 116 in which case user 102A may also optionally enable other users 102 to view and edit the content 702 of file 116.

To ensure secure sharing of files 116 and/or content 702, the system 700 can manage permission data structures 704 for each user 102 that participates in a communication session. An individual permission data structure 704A can define several fields of information such as a user ID 706A for identifying a user 102A associated with the permission data structure 704A as well as an organization 708A to identify an employer or other organization which the user 102A belongs to. Permission data structure 704A can also define various permissions such as read permission 710A which can enable a user 102A to access file 116 and view content 702 and write permission 712A which can enable a user 102A to access file 116 and modify content 702. In addition, file ownership 714A can designate a particular user 102A as the owner of file 116 and override read permission 710A and write permission 712A. As shown in FIG. 7A, file ownership 714 indicates that user 102A is the owner of file 116. Accordingly, user 102A is granted read permission 710A and write permission 712A.

In contrast, permission data structure 704B which can be associated with user 102B indicates that user 102B does have access to file 116. Specifically, read permission 710B and write permission 712B indicate that user 102B is not permitted to view or modify content 702 within file 116. However, in response to gesture input 106, the system 700 can modify read permission 710B in permission data structure 704B to enable user 102B to view the content 702 of file 116 as shown in FIG. 7B. In this example, the system 700 is configured to grant read permission 710B to user 102B in response to gesture input 106 but not write permission 712B. As such, user 102B may access and view the content 702 of file 116 but may not modify content 702. In other configurations, gesture input 106 may cause the system 700 to grant both read permission 710B and write permission 712B to user 102B. Alternatively, as mentioned above, system 700 can be configured to not grant read permission 710B or write permission 712B and merely grant user 102B permission to view a rendering of content 702. In this instance, computing device 104B does not receive file 116 but only the rendering of content 702. It should be understood that the system 700 can be configured to modify permission data structures 704 to grant any privileges and permissions as well as any combination thereof.

Figure 7C:
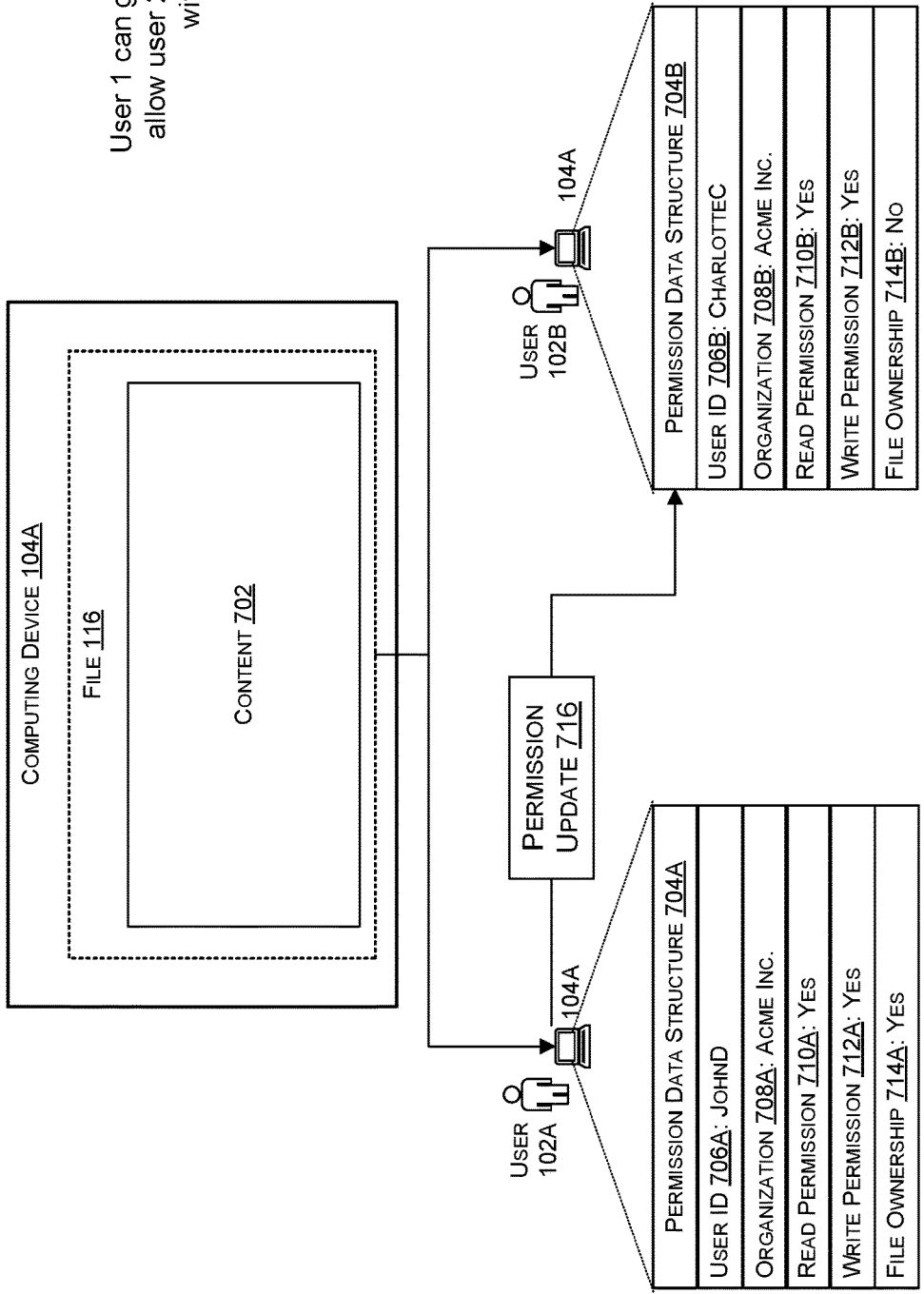
FIG. 7C shows the block diagram of the data structure in a third step of a process for managing user permissions in a communication session.

Turning now to FIG. 7C, user 102A may wish to utilize co-authoring features and elect to grant user 102B permission to edit the content 702 of file 116. In response, the system 700 can generate a permission update 716 via computing device 104A. Permission update 716 can define one or more modifications to permission data structure 704B. In this example, permission update 716 modifies permission data structure 704B to grand write permission 712B. However, it should be understood that permission update 716 can be configured to modify any number of data fields within permission data structure 704B.

Proceeding now to FIG. 7D, following the permission update 716 as shown in FIG. 7C user 102A and 102B can now simultaneously modify the content 702 of file 116. Subsequently, a third user 102C is added to the communication session. This can be achieved with a second gesture input 106 such as in the examples discussed above with respect to FIG. 5A through 5D. In response, user 102C is assigned a permission data structure 704C that is configured to grand read permission 710C while restricting write permission 712C. In addition, the system 700 can be configured to detect that user 102C belongs to an organization 708C ("Client Corp.") that is different from the organization 708A that user 102A, the owner of file 116, belongs to ("Acme Inc."). Accordingly, user 102C may be granted different privileges and/or permissions as a user 102B who belongs to the same organization 708B. In a specific example, a user 102B who belongs to the same organization 708B as the owner of the file 116 can be granted read permission 712B by default whereas a user 102C that hails from a different organization 708C may be restricted from receiving the file 116. Instead, user 102C in this example may merely receive a rendering of the content 702 instead of the file 116 itself.

Figure 8:
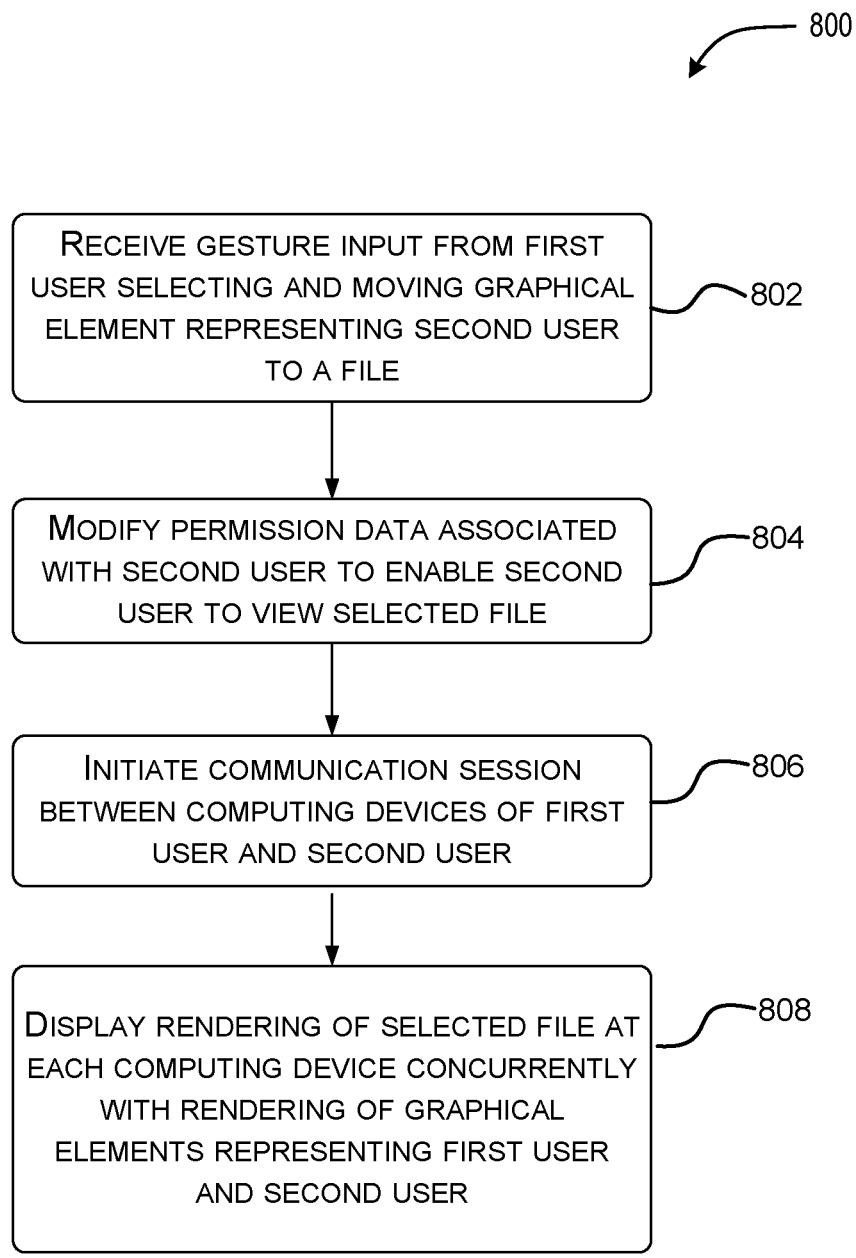
FIG. 8 is a flow diagram showing aspects of a routine for initiating a communication session with a gesture input.

Turning now to FIG. 8, aspects of a routine 800 for utilizing a gesture input to select and move an avatar representing a user to a file to select the file for sharing in a communication session are shown and described. Generally, the routine 800 involves a user selecting a file (opened or unopened) on the user's screen such as the spreadsheet of FIG. 2B; the user dragging and dropping select representations or avatars of other users into the file; in response to the drag and drop input of the select users into the file, the backend system automatically initiates a conference among the users with screen sharing of the document based on the file; or opens the document corresponding to the file on each user's screen to enable a co-authoring session based on the file on each user's computer. In addition the system can provide access and suitable privileges to the select users with respect to the file.

It should be understood that the operations of the methods disclosed herein are not presented in any particular order and that performance of some or all of the operations in an alternative order(s) is possible and is contemplated. The operations have been presented in the demonstrated order for ease of description and illustration. Operations may be rearranged, added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

It should be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 8, the routine 800 begins at operation 802 where the computing device 104A receives a gesture input 106 from a first user 102A that indicates a selection and movement of a graphical element (e.g., avatar 102B') representing a second user 102B form a first position to a file 116 at a second position which selects the file 116. As mentioned above, gesture input 106 can be a drag and drop input that can be performed with a mouse, touch input, or other suitable input device such as stylus. In other configurations, gesture input 106 can be performed using a voice command such as voice input 108 or a physical gesture that is derived from video input 110 as well as any combination of input methods.

Next, at operation 804, in response to the gesture input 106, permission data 704B for the second user 102B can be modified to enable the second user 102B to view the file 116. For instance, this can be achieved by modifying permission data structure 704B to grant user 102B read permission 710B. In another example, permission data structure 704B may be modified to merely grant user 102B access to a rendering of content 702 of file 116 and not the file 166 itself.

Proceeding to operation 806, in response to the gesture input 106, the system 100 can initiate a communication session between the first computing device 104A of the first user 102A and a second computing device 104B of second user 102B. As mentioned above, the communication session can include video, audio, as well as text chats. It should also be understood that the communication session can include any number of users 102.

Finally, at operation 808, after configuring permission data structures 704 for each user 102 and initiating the communication session, the system 100 can display a rendering of the file 116 at each computing device 104 involved in the communication session. The rendering of the file 116 can also be displayed concurrently with the graphical user interface elements or avatars 102B' of each user as discussed above with respect to FIG. 2A through 2C. In some configurations, the avatars 102B' and 102C' can be modified from their original size and/or orientation to suit the shared space of the file 116. For example, this can be accomplished using avatar icons 102B" and 102C" as illustrated and discussed above with respect to FIG. 2C.

Figure 9:
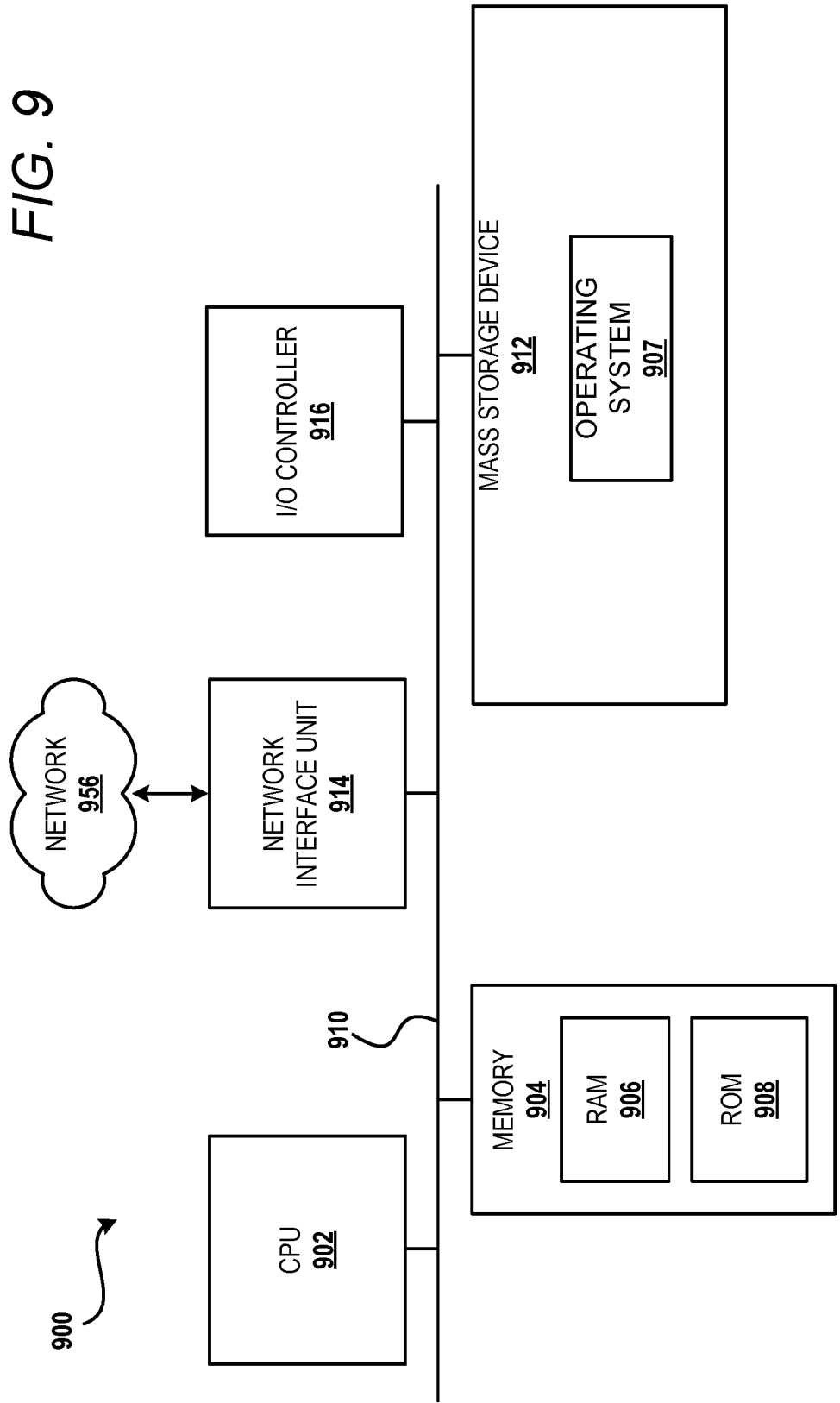
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a computer, such as the computing device 104A, capable of executing the program components described herein. Thus, the computer architecture 900 illustrated in FIG. 9 illustrates an architecture for a server computer, a mobile phone, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 907, other data, and one or more applications that can perform the techniques disclosed herein.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900.

In contrast to computer storage media and non-transitory computer-readable storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 900 may operate in a networked environment using logical connections to remote computers through the network 956 and/or another network (not shown). The computer architecture 900 may connect to the network 956 through a network interface unit 914 connected to the bus 910. It should be appreciated that the network interface unit 914 also may be utilized to connect to other types of networks and remote computer systems. The computer architecture 900 also may include an input/output controller 916 for receiving and processing input from a number of other devices, including a keyboard, mouse, or electronic stylus (not shown in FIG. 9). Similarly, the input/output controller 616 may provide output to a display screen, a printer, or other type of output device (also not shown in FIG. 9).

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

Figure 10:
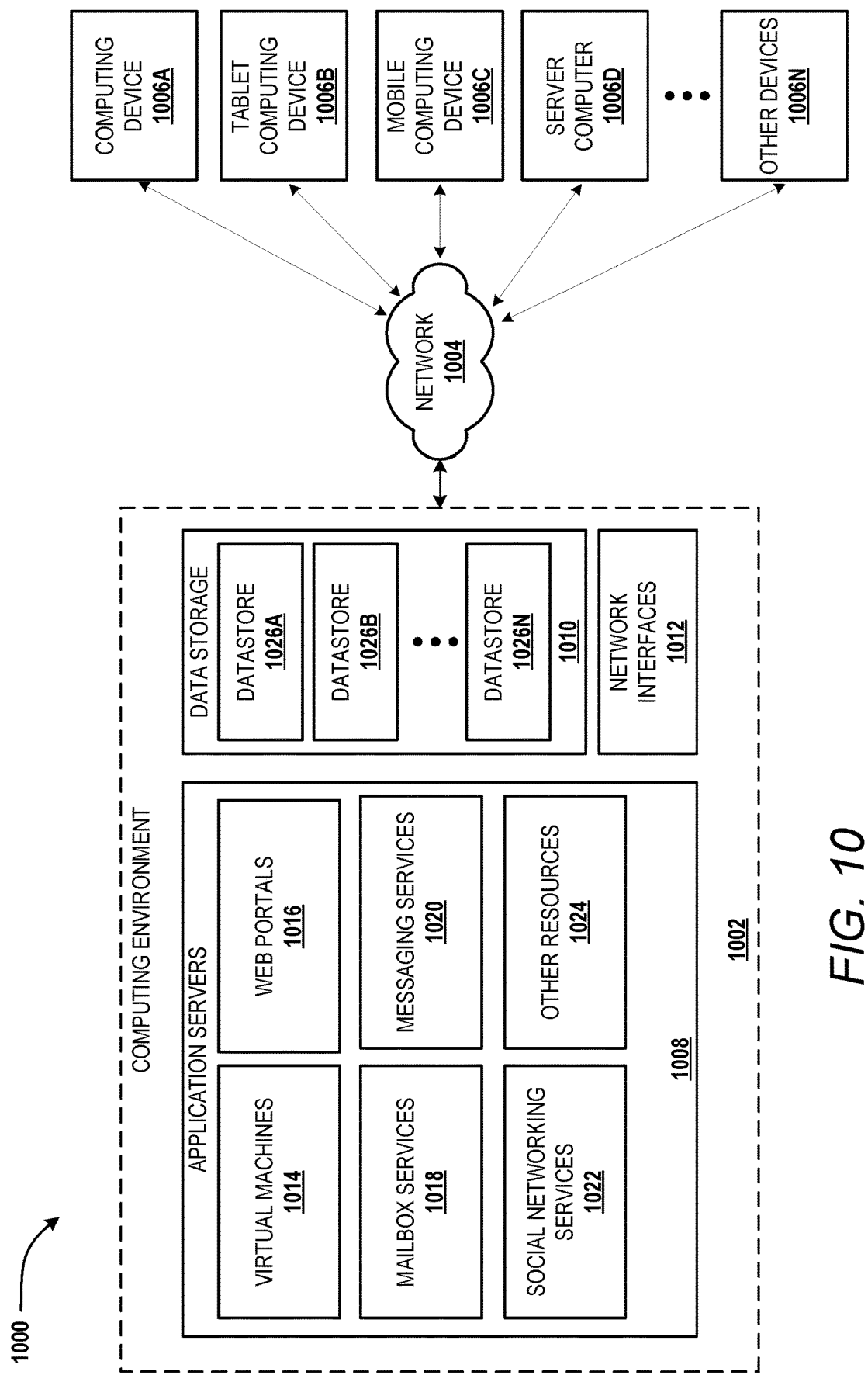
FIG. 10 is a diagram illustrating a distributed computing environment capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein.

According to various implementations, the distributed computing environment 1000 includes a computing environment 1002 operating on, in communication with, or as part of the network 1004. The network 1004 may be or may include the network 956, described above with reference to FIG. 9. The network 1004 also can include various access networks. One or more client devices 1006A-1006N (hereinafter referred to collectively and/or generically as "clients 1006" and also referred to herein as computing devices 104) can communicate with the computing environment 1002 via the network 1004 and/or other connections (not illustrated in FIG. 10). In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 702. It should be understood that the illustrated clients 1006 and computing architectures illustrated and described herein are illustrative and should not be construed as being limited in any way.

In the illustrated configuration, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. The application servers 1008 can host various services, virtual machines, portals, and/or other resources. In the illustrated configuration, the application servers 1008 host one or more virtual machines 1014 for hosting applications or other functionality. According to various implementations, the virtual machines 1014 host one or more applications and/or software modules for enabling efficient testing disclosed herein. It should be understood that this configuration is illustrative, and should not be construed as being limiting in any way. The application servers 1008 also host or provide access to one or more portals, link pages, Web sites, and/or other information ("Web portals") 1016.

According to various implementations, the application servers 1008 also include one or more mailbox services 1018 and one or more messaging services 1020. The mailbox services 1018 can include electronic mail ("email") services. The mailbox services 1018 also can include various personal information management ("PIM") and presence services including, but not limited to, calendar services, contact management services, collaboration services, and/or other services. The messaging services 1020 can include, but are not limited to, instant messaging services, chat services, forum services, and/or other communication services.

The application servers 1008 also may include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1022 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1022 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Washington Other services are possible and are contemplated.

The social networking services 1022 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1022 are not mentioned herein for the sake of brevity. As such, the above configurations are illustrative, and should not be construed as being limited in any way. According to various implementations, the social networking services 1022 may host one or more applications and/or software modules for providing the functionality described herein. For instance, any one of the application servers 1008 may communicate or facilitate the functionality and features described herein. For instance, a social networking application, mail client, messaging client or a browser running on a phone or any other client 1006 may communicate with a networking service 1022 and facilitate the functionality, even in part, described above with respect to FIG. 10. Any device or service depicted herein can be used as a resource for supplemental data, including email servers, storage servers, etc.

As shown in FIG. 10, the application servers 1008 also can host other services, applications, portals, and/or other resources ("other resources") 1024. The other resources 1024 can include, but are not limited to, document sharing, rendering or any other functionality. It thus can be appreciated that the computing environment 1002 can provide integration of the concepts and technologies disclosed herein with various mailbox, messaging, social networking, and/or other services or resources.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the application servers 1008 and/or other data. Although not illustrated in FIG. 10, the datastores 1026 also can host or store web page documents, word documents, presentation documents, data structures, algorithms for execution by a recommendation engine, and/or other data utilized by any application program or another module. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects. In one specific example, as summarized above, techniques described herein may be implemented, at least in part, by web browser application, which works in conjunction with the application servers 1008 of FIG. 10.

Turning now to FIG. 11, an illustrative computing device architecture 1100 for a computing device that is capable of executing various software components described herein for enabling the techniques disclosed herein. The computing device architecture 1100 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1100 is applicable to any of the computing devices shown in the figures. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 1100 illustrated in FIG. 11 includes a processor 1102, memory components 1104, network connectivity components 1106, sensor components 1108, input/output components 1110, and power components 1112. In the illustrated configuration, the processor 1102 is in communication with the memory components 1104, the network connectivity components 1106, the sensor components 1108, the input/output ("I/O") components 1110, and the power components 1112. Although no connections are shown between the individuals components illustrated in FIG. 11, the components can interact to carry out device functions. In some configurations, the components are arranged so as to communicate via one or more busses (not shown).

The processor 1102 includes a central processing unit ("CPU") configured to process data, execute computer-executable instructions of one or more application programs, and communicate with other components of the computing device architecture 1100 in order to perform various functionality described herein. The processor 1102 may be utilized to execute aspects of the software components presented herein and, particularly, those that utilize, at least in part, a touch-enabled input.

In some configurations, the processor 1102 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1102 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1102 is, or is included in, a system-on-chip ("SoC") along with one or more of the other components described herein below. For example, the SoC may include the processor 1102, a GPU, one or more of the network connectivity components 1106, and one or more of the sensor components 1108. In some configurations, the processor 1102 is fabricated, in part, utilizing a package-on-package ("PoP") integrated circuit packaging technique. The processor 1102 may be a single core or multi-core processor.

The processor 1102 may be created in accordance with an ARM architecture, available for license from ARM HOLDINGS of Cambridge, United Kingdom. Alternatively, the processor 1102 may be created in accordance with an x86 architecture, such as is available from INTEL CORPORATION of Santa Clara, California and others. In some configurations, the processor 1102 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 1004 include a random access memory ("RAM") 1114, a read-only memory ("ROM") 1116, an integrated storage memory ("integrated storage") 1118, and a removable storage memory ("removable storage") 1120. In some configurations, the RAM 1114 or a portion thereof, the ROM 1116 or a portion thereof, and/or some combination of the RAM 1114 and the ROM 1116 is integrated in the processor 1102. In some configurations, the ROM 1116 is configured to store a firmware, an operating system or a portion thereof (e.g., operating system kernel), and/or a bootloader to load an operating system kernel from the integrated storage 1118 and/or the removable storage 1120.

The integrated storage 1118 can include a solid-state memory, a hard disk, or a combination of solid-state memory and a hard disk. The integrated storage 1118 may be soldered or otherwise connected to a logic board upon which the processor 1102 and other components described herein also may be connected. As such, the integrated storage 1118 is integrated in the computing device. The integrated storage 1118 is configured to store an operating system or portions thereof, application programs, data, and other software components described herein.

The removable storage 1120 can include a solid-state memory, a hard disk, or a combination of solid-state memory and a hard disk. In some configurations, the removable storage 1120 is provided in lieu of the integrated storage 1118. In other configurations, the removable storage 1120 is provided as additional optional storage. In some configurations, the removable storage 1120 is logically combined with the integrated storage 1118 such that the total available storage is made available as a total combined storage capacity. In some configurations, the total combined capacity of the integrated storage 1118 and the removable storage 1120 is shown to a user instead of separate storage capacities for the integrated storage 1118 and the removable storage 1120.

The removable storage 1120 is configured to be inserted into a removable storage memory slot (not shown) or other mechanism by which the removable storage 1120 is inserted and secured to facilitate a connection over which the removable storage 1120 can communicate with other components of the computing device, such as the processor 1102. The removable storage 1120 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1104 can store an operating system. According to various configurations, the operating system includes, but is not limited to WINDOWS MOBILE OS from Microsoft Corporation of Redmond, Washington, WINDOWS PHONE OS from Microsoft Corporation, WINDOWS from Microsoft Corporation, PALM WEBOS from Hewlett-Packard Company of Palo Alto, California, BLACKBERRY OS from Research In Motion Limited of Waterloo, Ontario, Canada, IOS from Apple Inc. of Cupertino, California, and ANDROID OS from Google Inc. of Mountain View, California Other operating systems are contemplated.

The network connectivity components 1106 include a wireless wide area network component ("WWAN component") 1122, a wireless local area network component ("WLAN component") 1124, and a wireless personal area network component ("WPAN component") 1126. The network connectivity components 1106 facilitate communications to and from the network 1156 or another network, which may be a WWAN, a WLAN, or a WPAN. Although only the network 1156 is illustrated, the network connectivity components 1106 may facilitate simultaneous communication with multiple networks, including the network 904 of FIG. 9. For example, the network connectivity components 1106 may facilitate simultaneous communications with multiple networks via one or more of a WWAN, a WLAN, or a WPAN.

The network 1156 may be or may include a WWAN, such as a mobile telecommunications network utilizing one or more mobile telecommunications technologies to provide voice and/or data services to a computing device utilizing the computing device architecture 1100 via the WWAN component 1122. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1156 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1156 may be configured to provide voice and/or data communications with any combination of the above technologies. The network 1156 may be configured to or adapted to provide voice and/or data communications in accordance with future generation technologies.

In some configurations, the WWAN component 1122 is configured to provide dual-multi-mode connectivity to the network 1156. For example, the WWAN component 1122 may be configured to provide connectivity to the network 1156, wherein the network 1156 provides service via GSM and UMTS technologies, or via some other combination of technologies. Alternatively, multiple WWAN components 1122 may be utilized to perform such functionality, and/or provide additional functionality to support other non-compatible technologies (i.e., incapable of being supported by a single WWAN component). The WWAN component 1122 may facilitate similar connectivity to multiple networks (e.g., a UMTS network and an LTE network).

The network 1156 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1124 is configured to connect to the network 1156 via the WI-FI access points. Such connections may be secured via various encryption technologies including, but not limited, WI-FI Protected Access ("WPA"), WPA2, Wired Equivalent Privacy ("WEP"), and the like.

The network 1156 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1126 is configured to facilitate communications with other devices, such as peripherals, computers, or other computing devices via the WPAN.

The sensor components 1108 include a magnetometer 1128, an ambient light sensor 1130, a proximity sensor 1132, an accelerometer 1134, a gyroscope 1136, and a Global Positioning System sensor ("GPS sensor") 1138. It is contemplated that other sensors, such as, but not limited to, temperature sensors or shock detection sensors, also may be incorporated in the computing device architecture 1100.

The magnetometer 1128 is configured to measure the strength and direction of a magnetic field. In some configurations the magnetometer 1128 provides measurements to a compass application program stored within one of the memory components 1104 in order to provide a user with accurate directions in a frame of reference including the cardinal directions, north, south, east, and west. Similar measurements may be provided to a navigation application program that includes a compass component. Other uses of measurements obtained by the magnetometer 1128 are contemplated.

The ambient light sensor 1130 is configured to measure ambient light. In some configurations, the ambient light sensor 1130 provides measurements to an application program stored within one the memory components 1104 in order to automatically adjust the brightness of a display (described below) to compensate for low-light and high-light environments. Other uses of measurements obtained by the ambient light sensor 1130 are contemplated.

The proximity sensor 1132 is configured to detect the presence of an object or thing in proximity to the computing device without direct contact. In some configurations, the proximity sensor 1132 detects the presence of a user's body (e.g., the user's face) and provides this information to an application program stored within one of the memory components 1104 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1132 are contemplated.

The accelerometer 1134 is configured to measure proper acceleration. In some configurations, output from the accelerometer 1134 is used by an application program as an input mechanism to control some functionality of the application program. For example, the application program may be a video game in which a character, a portion thereof, or an object is moved or otherwise manipulated in response to input received via the accelerometer 1134. In some configurations, output from the accelerometer 1134 is provided to an application program for use in switching between landscape and portrait modes, calculating coordinate acceleration, or detecting a fall. Other uses of the accelerometer 1134 are contemplated.

The gyroscope 1136 is configured to measure and maintain orientation. In some configurations, output from the gyroscope 1136 is used by an application program as an input mechanism to control some functionality of the application program. For example, the gyroscope 1136 can be used for accurate recognition of movement within a 3D environment of a video game application or some other application. In some configurations, an application program utilizes output from the gyroscope 1136 and the accelerometer 1134 to enhance control of some functionality of the application program. Other uses of the gyroscope 1136 are contemplated.

The GPS sensor 1138 is configured to receive signals from GPS satellites for use in calculating a location. The location calculated by the GPS sensor 1138 may be used by any application program that requires or benefits from location information. For example, the location calculated by the GPS sensor 1138 may be used with a navigation application program to provide directions from the location to a destination or directions from the destination to the location. Moreover, the GPS sensor 1138 may be used to provide location information to an external location-based service, such as E911 service. The GPS sensor 1138 may obtain location information generated via WI-FI, WIMAX, and/or cellular triangulation techniques utilizing one or more of the network connectivity components 1106 to aid the GPS sensor 1138 in obtaining a location fix. The GPS sensor 1138 may also be used in Assisted GPS ("A-GPS") systems. The GPS sensor 1138 can also operate in conjunction with other components, such as the processor 1102, to generate positioning data for the computing device 1100.

The I/O components 1110 include a display 1140, a touchscreen 1142, a data I/O interface component ("data I/O") 1144, an audio I/O interface component ("audio I/O") 1146, a video I/O interface component ("video I/O") 1148, and a camera 1150. In some configurations, the display 1140 and the touchscreen 1142 are combined. In some configurations two or more of the data I/O component 1144, the audio I/O component 1146, and the video I/O component 1148 are combined. The I/O components 1110 may include discrete processors configured to support the various interface described below or may include processing functionality built-in to the processor 1102.

The display 1140 is an output device configured to present information in a visual form. In particular, the display 1140 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1140 is a liquid crystal display ("LCD") utilizing any active or passive matrix technology and any backlighting technology (if used). In some configurations, the display 1140 is an organic light emitting diode ("OLED") display. Other display types are contemplated.

The touchscreen 1142, also referred to herein as a "touch-enabled screen," is an input device configured to detect the presence and location of a touch. The touchscreen 1142 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1142 is incorporated on top of the display 1140 as a transparent layer to enable a user to use one or more touches to interact with objects or other information presented on the display 1140. In other configurations, the touchscreen 1142 is a touch pad incorporated on a surface of the computing device that does not include the display 1140. For example, the computing device may have a touchscreen incorporated on top of the display 1140 and a touch pad on a surface opposite the display 1140.

In some configurations, the touchscreen 1142 is a single-touch touchscreen. In other configurations, the touchscreen 1142 is a multi-touch touchscreen. In some configurations, the touchscreen 1142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1142. As such, a developer may create gestures that are specific to a particular application program.

In some configurations, the touchscreen 1142 supports a tap gesture in which a user taps the touchscreen 1142 once on an item presented on the display 1140. The tap gesture may be used for various reasons including, but not limited to, opening or launching whatever the user taps. In some configurations, the touchscreen 1142 supports a double tap gesture in which a user taps the touchscreen 1142 twice on an item presented on the display 1140. The double tap gesture may be used for various reasons including, but not limited to, zooming in or zooming out in stages. In some configurations, the touchscreen 1142 supports a tap and hold gesture in which a user taps the touchscreen 1142 and maintains contact for at least a pre-defined time. The tap and hold gesture may be used for various reasons including, but not limited to, opening a context-specific menu.

In some configurations, the touchscreen 1142 supports a pan gesture in which a user places a finger on the touchscreen 1142 and maintains contact with the touchscreen 1142 while moving the finger on the touchscreen 1142. The pan gesture may be used for various reasons including, but not limited to, moving through screens, images, or menus at a controlled rate. Multiple finger pan gestures are also contemplated. In some configurations, the touchscreen 1142 supports a flick gesture in which a user swipes a finger in the direction the user wants the screen to move. The flick gesture may be used for various reasons including, but not limited to, scrolling horizontally or vertically through menus or pages. In some configurations, the touchscreen 1142 supports a pinch and stretch gesture in which a user makes a pinching motion with two fingers (e.g., thumb and forefinger) on the touchscreen 1142 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1142. As such, the above gestures should be understood as being illustrative and should not be construed as being limiting in any way.

The data I/O interface component 1144 is configured to facilitate input of data to the computing device and output of data from the computing device. In some configurations, the data I/O interface component 1144 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1146 is configured to provide audio input and/or output capabilities to the computing device. In some configurations, the audio I/O interface component 1146 includes a microphone configured to collect audio signals. In some configurations, the audio I/O interface component 1146 includes a headphone jack configured to provide connectivity for headphones or other external speakers. In some configurations, the audio I/O interface component 1146 includes a speaker for the output of audio signals. In some configurations, the audio I/O interface component 1146 includes an optical audio cable out.

The video I/O interface component 1148 is configured to provide video input and/or output capabilities to the computing device. In some configurations, the video I/O interface component 1148 includes a video connector configured to receive video as input from another device (e.g., a video media player such as a DVD or BLURAY player) or send video as output to another device (e.g., a monitor, a television, or some other external display). In some configurations, the video I/O interface component 1148 includes a High-Definition Multimedia Interface ("HDMI"), mini-HDMI, micro-HDMI, DisplayPort, or proprietary connector to input/output video content. In some configurations, the video I/O interface component 1148 or portions thereof is combined with the audio I/O interface component 1146 or portions thereof.

The camera 1150 can be configured to capture still images and/or video. The camera 1150 may utilize a charge coupled device ("CCD") or a complementary metal oxide semiconductor ("CMOS") image sensor to capture images. In some configurations, the camera 1150 includes a flash to aid in taking pictures in low-light environments. Settings for the camera 1150 may be implemented as hardware or software buttons.

Although not illustrated, one or more hardware buttons may also be included in the computing device architecture 1100. The hardware buttons may be used for controlling some operational aspect of the computing device. The hardware buttons may be dedicated buttons or multi-use buttons. The hardware buttons may be mechanical or sensor-based.

The illustrated power components 1112 include one or more batteries 1152, which can be connected to a battery gauge 1154. The batteries 1152 may be rechargeable or disposable. Rechargeable battery types include, but are not limited to, lithium polymer, lithium ion, nickel cadmium, and nickel metal hydride. Each of the batteries 1152 may be made of one or more cells.

The battery gauge 1154 can be configured to measure battery parameters such as current, voltage, and temperature. In some configurations, the battery gauge 1154 is configured to measure the effect of a battery's discharge rate, temperature, age and other factors to predict remaining life within a certain percentage of error. In some configurations, the battery gauge 1154 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1112 may also include a power connector, which may be combined with one or more of the aforementioned I/O components 1110. The power components 1112 may interface with an external power system or charging equipment via an I/O component.

The disclosure presented herein also encompasses the subject matter set forth in the following clauses.

Example Clause A, a method comprising: receiving, at a first computing device associated with a first user, a gesture input indicating a selection and a movement of a graphical element representing a second user from a first position to a file at a second position to associate the second user with the file, wherein the gesture input indicates a selection of the file; in response to receiving the gesture input, modifying permission data associated with the second user to enable a second computing device associated with the second user to display the file selected by the gesture input received from the first user; initiating a communication session between the first computing device and the second computing device respectively associated with the first user and the second user, wherein the permission data is configured to control the display of the file content and control editing rights of the first user and second user; and causing a display of a rendering of the file at the first computing device and the second computing device respectively associated with the first user and the second user concurrently with a rendering of a graphical element representing the first user and the graphical element representing the second user.

Example Clause B, the method of Example Clause A, further comprising: receiving a user input from the first user modifying the permission data associated with the second user to grant the second user permission to edit the file; and in response to the modification of the permission data associated with the second user, causing a display of one or more graphical elements at the second computing device to enable the second user to edit the file.

Example Clause C, the method of Example Clause A or Example Clause B, wherein the first user and the second user are part of a separate communication session that occurred prior to the communication session that is initiated in response to receiving the gesture input.

Example Clause D, the method of any one of Example Clauses A through C, wherein the graphical element representing the second user comprises a rendering of a digital appearance generated by the second user.

Example Clause E, the method of any one of Example Clauses A through D, wherein the gesture input indicates a selection and a movement of two or more graphical elements representing two or more respective users.

Example Clause F, the method of any one of Example Clauses A through E, wherein the graphical element representing the second user further comprises a graphical icon indicating a current status of the second user.

Example Clause G, the method of any one of Example Clauses A through F, wherein a rendering of communication data generated by the second user is displayed concurrently with the graphical element representing the second user and the rendering of the file selected by the gesture input.

Example Clause H, a system comprising: one or more processing units; and a computer-readable medium having encoded thereon instructions that when executed by the one or more processing units cause the system to: receive, at a first computing device associated with a first user, a gesture input indicating a selection and a movement of a graphical user interface element representing a second user from a first position to a file at a second position to associate the second user with the file, wherein the gesture input indicates a selection of the file; in response to receiving the gesture input, modify permission data associated with the second user to enable the second user to view the file selected by the gesture input received from the first user; initiate a communication session between a plurality of computing devices associated with the first user and the second user based on the permission data; and cause a display of a rendering of the file selected by the gesture input at each of the plurality of computing devices associated with the first user and the second user concurrently with a rendering of a graphical user interface element representing the first user and the graphical user interface element representing the second user.

Example Clause I, the system of Example Clause H, wherein the computer-readable instructions further cause the system to: receive a user input from the first user modifying the permission data associated with the second user to grant the second user permission to edit the file; and in response to the modification of the permission data associated with the second user, cause a display of one or more graphical interface elements at the second computing device to enable the second user to edit the file.

Example Clause J, the system of Example Clause H or Example Clause I, wherein the first user and the second user are part of a separate communication session that occurred prior to the communication session that is initiated in response to receiving the gesture input.

Example Clause K, the system of any one of Example Clauses H through J, wherein the graphical user interface element representing the second user comprises a rendering of a digital appearance generated by the second user.

Example Clause L, the system of any one of Example Clauses H through K, wherein the gesture input indicates a selection and a movement of two or more graphical user interface elements representing two or more respective users.

Example Clause M, the system of any one of Example Clauses H through L, wherein the graphical user interface element representing the second user further comprises a graphical icon indicating a current status of the second user.

Example Clause N, the system of any one of Example Clauses H through M, wherein a rendering of communication data generated by the second user is displayed concurrently with the graphical user interface element representing the second user and the rendering of the file selected by the gesture input.

Example Clause O, a computer-readable storage medium having encoded thereon computer-readable instructions that when executed by one or more processing units causes the one or more processing units to: receive, at a first computing device associated with a first user, a gesture input indicating a selection and a movement of a graphical user interface element representing a second user from a first position to a file at a second position to associate the second user with the file, wherein the gesture input indicates a selection of the file; in response to receiving the gesture input, modify permission data associated with the second user to enable the second user to view the file selected by the gesture input received from the first user; initiate a communication session between a plurality of computing devices associated with the first user and the second user based on the permission data; and cause a display of a rendering of the file selected by the gesture input at each of the plurality of computing devices associated with the first user and the second user concurrently with a rendering of a graphical user interface element representing the first user and the graphical user interface element representing the second user.

Example Clause P, the computer-readable storage medium of Example Clause O, wherein the computer-readable instructions further cause the one or more processing units to: receive a user input from the first user modifying the permission data associated with the second user to grant the second user permission to edit the file; and in response to the modification of the permission data associated with the second user, cause a display of one or more graphical interface elements at the second computing device to enable the second user to edit the file.

Example Clause Q, the computer-readable storage medium of Example Clause O or Example Clause P, wherein the first user and the second user are part of a separate communication session that occurred prior to the communication session that is initiated in response to receiving the gesture input.

Example Clause R, the computer-readable storage medium of any one of Example Clauses O through Q, wherein the gesture input indicates a selection and a movement of two or more graphical user interface elements representing two or more respective users.

Example Clause S, the computer-readable storage medium of any one of Example Clauses O through R, wherein the graphical user interface element representing the second user further comprises a graphical icon indicating a current status of the second user.

Example Clause T, the computer-readable storage medium of any one of Example Clauses O through S, wherein a rendering of communication data generated by the second user is displayed concurrently with the graphical user interface element representing the second user and the rendering of the file selected by the gesture input.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
receiving, at a first computing device associated with a first user, a single input of a drag and drop gesture for moving a graphical element representing a second user from a first position to a representation of a file at a second position to associate the second user with the file, wherein the single input is received prior to an establishment of a communication session involving the first computing device;
in response to receiving the single input without requiring additional input from the first computing device associated with the first user;
initiating a communication session between the first computing device and the second computing device respectively associated with the first user and the second user wherein the communication session between the first computing device and the second computing device is initiated by the single input of the drag and drop gesture for moving the graphical element representing the second user from the first position to the representation of the file at the second position, the single input of the drag and drop gesture for moving the graphical element representing the second user from the first position to the representation of the file associating that second user with the file; and
causing a display of a rendering of the file to display contents of the file at the first computing device and the second computing device respectively associated with the first user and the second user concurrently with a rendering of a graphical element representing the first user and the graphical element representing the second user, wherein the display of the rendering of the file at the first computing device and the second computing device is in response to the single input without additional input from the first computing device associated with the first user.

2. The method of claim 1, further comprising:
receiving a user input from the first user modifying the permission data associated with the second user to grant the second user permission to edit the file; and
in response to the modification of the permission data associated with the second user, causing a display of one or more graphical elements at the second computing device to enable the second user to edit the file.

3. The method of claim 1, wherein the first user and the second user are part of a separate communication session that occurred prior to the communication session that is initiated in response to receiving the gesture input.

4. The method of claim 1, wherein the graphical element representing the second user comprises a rendering of a digital appearance generated by the second user.

5. The method of claim 1, wherein the graphical element representing the second user further comprises a graphical icon indicating a current status of the second user.

6. The method of claim 1, wherein a rendering of communication data generated by the second user is displayed concurrently with the graphical element representing the second user and the rendering of the file selected by the gesture input.

7. The method of claim 1, wherein the communication session between the first computing device and the second computing device is initiated without requiring an input to open a separate communication application to facilitate the communication session.

8. The method of claim 1, wherein, prior to the gesture input of moving the graphical element representing the second user from the first position to the representation of the file, the first computing device operates in a first state displaying an operating system environment, wherein the gesture input of moving the graphical element representing the second user from the first position to the representation of the file causes the first computing device to operate in a second state displaying a shared space, wherein the shared space displays the rendering of the file at the first computing device.

9. The method of claim 1, wherein, prior to the gesture input of moving the graphical element representing the second user from the first position to the representation of the file, the first computing device operates in a first state displaying an operating system environment, wherein the gesture input of moving the graphical element representing the second user from the first position to the representation of the file causes the first computing device to operate in a second state displaying a shared space, wherein the shared space displays the rendering of the file at the first computing device, wherein the first computing device, while in the second state, accesses functionality of a communication application to cause the display of the rendering of the file at the first computing device and the second computing device without opening an additional user interface of a communication application.

10. The method of claim 1, wherein, prior to the gesture input of moving the graphical element representing the second user from the first position to the representation of the file, the first computing device operates in a first state displaying an operating system environment, wherein the first computing device does not permit edits to the file while in the first operating state, wherein the gesture input of moving the graphical element representing the second user from the first position to the representation of the file causes the first computing device to operate in a second state displaying a shared space, wherein the shared space displays the rendering of the file at the first computing device, wherein the first computing device permits edits to the file while in the second operating state.

11. The method of claim 1, wherein, prior to the gesture input of moving the graphical element representing the second user from the first position to the representation of the file, the first computing device operates in a first state displaying an operating system environment, wherein permissions of the first computing device does not permit edits to the file while in the first operating state, wherein the gesture input of moving the graphical element representing the second user from the first position to the representation of the file changes the permissions and causes the first computing device to operate in a second state displaying a shared space, wherein the shared space displays the rendering of the file at the first computing device, wherein the first computing device and the second computing device have new permissions to permit edits to the file in response to the gesture input of moving the graphical element representing the second user from the first position to the representation of the file.

12. The method of claim 1, wherein, prior to the gesture input of moving the graphical element representing the second user from the first position to the representation of the file, the first computing device and the second computing device operate in a first state displaying an operating system environment where the second computing device has permissions that restrict the second computing device from editing the file, wherein the gesture input of moving the graphical element representing the second user from the first position to the representation of the file modifies the permissions and causes the first computing device and the second computing device to operate in a second state where the permissions allow the second computing device to edit the file.

13. The method of claim 12, wherein an input control received at the first computing device revokes the second computing device from access rights to control the virtual desktop and access rights to the file.

14. A system comprising:
one or more processing units; and
a computer-readable medium having encoded thereon instructions that when executed by the one or more processing units cause the system to:
receive, at a first computing device associated with a first user, a single input of a drag and drop gesture for moving a graphical user interface element representing a second user from a first position to a representation of a file at a second position to associate the second user with the file, wherein the single input is received prior to an establishment of a communication session involving the first computing device;
in response to receiving the single input without requiring additional input from the first computing device associated with the first user:
initiate a communication session between a plurality of computing devices associated with the first user and the second user wherein the communication session between the first computing device and the second computing device is initiated by the single input of the drag and drop gesture for moving the graphical element representing the second user from the first position to the representation of the file at the second position, the single input of the drag and drop gesture for moving the graphical element representing the second user from the first position to the representation of the file associating that second user with the file; and
cause a display of a rendering of the file to display contents of the file at each of the plurality of computing devices associated with the first user and the second user concurrently with a rendering of a graphical user interface element representing the first user and the graphical user interface element representing the second user, wherein the display of the rendering of the file at the first computing device and the second computing device is in response to the single input without additional input from the first computing device associated with the first user.

15. The system of claim 14, wherein the computer-readable instructions further cause the system to:
receive a user input from the first user modifying the permission data associated with the second user to grant the second user permission to edit the file; and
in response to the modification of the permission data associated with the second user, cause a display of one or more graphical interface elements at the second computing device to enable the second user to edit the file.

16. The system of claim 14, wherein a rendering of communication data generated by the second user is displayed concurrently with the graphical user interface element representing the second user and the rendering of the file selected by the gesture input.

17. A computer-readable storage medium having encoded thereon computer-readable instructions that when executed by one or more processing units causes the one or more processing units to:

receive, at a first computing device associated with a first user, a single input of a drag and drop gesture for moving a graphical user interface element representing a second user from a first position to a representation of a file at a second position to associate the second user with the file, wherein the single input is received prior to an establishment of a communication session involving the first computing device;

in response to receiving the single input without requiring additional input from the first computing device associated with the first user;

initiate a communication session between a plurality of computing devices associated with the first user and the second user wherein the communication session between the first computing device and the second computing device is initiated by the single input of the drag and drop gesture for moving the graphical element representing the second user from the first position to the representation of the file at the second position, the single input of the drag and drop gesture for moving the graphical element representing the second user from the first position to the representation of the file associating that second user with the file; and cause a display of a rendering of the file to display contents of the file at each of the plurality of computing devices associated with the first user and the second user concurrently with a rendering of a graphical user interface element representing the first user and the graphical user interface element representing the second user, wherein the display of the rendering of the file at the first computing device and the second computing device is in response to the single input without additional input from the first computing device associated with the first user.

18. The computer-readable storage medium of claim 17, wherein the computer-readable instructions further cause the one or more processing units to:

receive a user input from the first user modifying the permission data associated with the second user to grant the second user permission to edit the file; and in response to the modification of the permission data associated with the second user, cause a display of one or more graphical interface elements at the second computing device to enable the second user to edit the file.

19. The computer-readable storage medium of claim 17, wherein the gesture input indicates a selection and a movement of two or more graphical user interface elements representing two or more respective users.

20. The computer-readable storage medium of claim 17, wherein a rendering of communication data generated by the second user is displayed concurrently with the graphical user interface element representing the second user and the rendering of the file selected by the gesture input.

* * * * *